(12) United States Patent
Shirai

(10) Patent No.: US 7,692,824 B2
(45) Date of Patent: Apr. 6, 2010

(54) IMAGE READING APPARATUS

(75) Inventor: Takaaki Shirai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 860 days.

(21) Appl. No.: 11/528,527

(22) Filed: Sep. 28, 2006

(65) Prior Publication Data

US 2008/0309989 A1 Dec. 18, 2008

(30) Foreign Application Priority Data

Sep. 28, 2005 (JP) ............................ P2005-281473

(51) Int. Cl.
*H04N 1/04* (2006.01)
*G03G 15/00* (2006.01)
(52) U.S. Cl. ...................... 358/474; 358/496; 399/367; 399/395
(58) Field of Classification Search ................. 358/474, 358/505, 449, 496, 497, 498; 271/3.05, 3.08, 271/3.09, 3.14; 399/363, 365, 367, 394, 399/395
See application file for complete search history.

(56) References Cited

U.S. PATENT DOCUMENTS

| | | | |
|---|---|---|---|
| 5,918,876 A * | 7/1999 | Maruyama et al. .......... | 271/228 |
| 6,988,725 B2 * | 1/2006 | Rapkin ........................ | 271/227 |
| 2005/0230896 A1 * | 10/2005 | Funada ..................... | 270/58.08 |
| 2005/0230898 A1 * | 10/2005 | Suqiyama et al. ........ | 270/58.08 |
| 2005/0253886 A1 * | 11/2005 | Nakajima et al. ............. | 347/16 |
| 2006/0153610 A1 * | 7/2006 | Ishikuro ..................... | 399/401 |
| 2006/0245802 A1 * | 11/2006 | Shimizu ..................... | 399/367 |
| 2007/0070451 A1 * | 3/2007 | Kazama et al. ............. | 358/498 |
| 2007/0075483 A1 * | 4/2007 | Katayama ................... | 271/242 |

FOREIGN PATENT DOCUMENTS

JP     2002-77519     3/2002

* cited by examiner

*Primary Examiner*—Jerome Grant, II
(74) *Attorney, Agent, or Firm*—Baker Botts, LLP

(57) ABSTRACT

An image reading apparatus that includes: a document delivery path that couples, through a reading position, a document mounting portion and a document discharging portion; a switchback delivery path coupled to a predetermined position of the document delivery path and inverting a leading and a trailing end in the document from a downstream side of the reading position, thereby returning the document to an upstream side of the reading position; an image reading unit that reads the image of the document delivered in the reading position of the document delivery path; a skew detecting unit that detects a skew of the document passing through the reading position; and a control unit that delivers the document to the switchback delivery path to read both sides of the document again when the skew detecting unit detects the skew of the document.

8 Claims, 20 Drawing Sheets

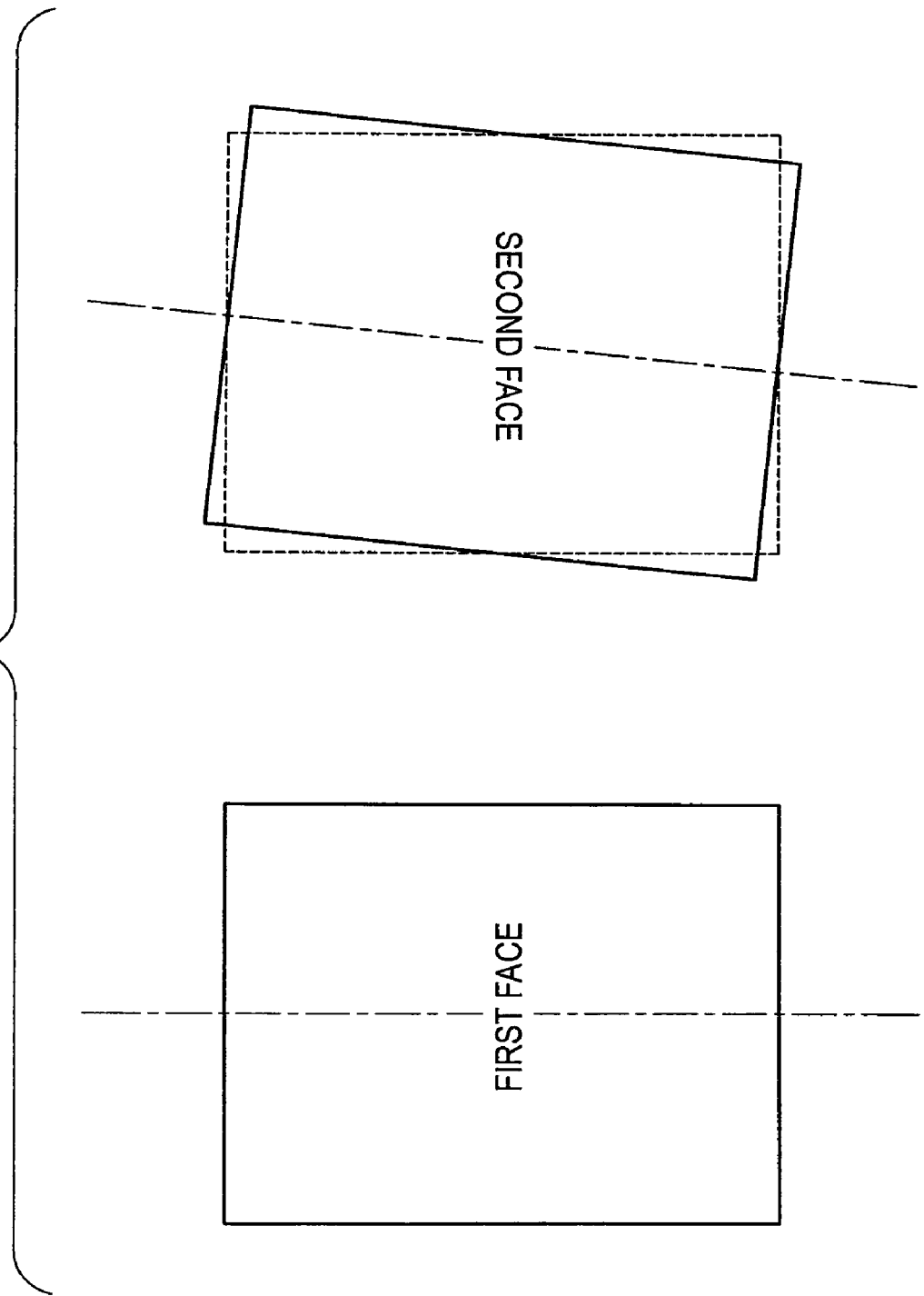

IMAGE READING APPARATUS

CROSS REFERENCE TO RELATED APPLICATION

This application claims priority from Japanese Patent Application No. 2005-281473, filed on Sep. 28, 2005, the entire subject matter of which is incorporated herein by reference.

TECHNICAL FIELD

Aspects of the present invention relate to an image reading apparatus in which a document mounting portion for mounting a document from which an image is to be read and a document discharging portion for discharging the document from which the image has been read are coupled to each other through a document delivery path via a reading position, and a switchback delivery path for inverting a leading and a trailing end in the document from a downstream side of the reading position and for returning the document to an upstream side of the reading position is coupled to a predetermined position in the document delivery path.

BACKGROUND

Conventionally, there has been known an image reading apparatus which is mounted on a copying device, a scanner device or a multi function device having a copy function and a scanner function and comprises an automatic document delivering device referred to as an ADF (Auto Document Feeder) for delivering a document from a sheet feed tray to a sheet discharge tray through a delivery path. Moreover, there has been known an automatic document delivering apparatus For switching back a document having both sides, that is, first and second faces, which are printed, in the middle of a delivery to invert a leading and a trailing end in the document, thereby carrying out a delivery for reading both sides for the document in order to read the document (for example, see Japanese Patent No. 3546822).

FIG. 19 shows a delivery path for a conventional image reading apparatus comprising an ADF capable of reading both sides. As shown in FIG. 19, a document P having a first face (a first page) mounted upward in a sheet feed tray 100 is fed to a delivery path 102 by means of a sheet feed roller 101. In the delivery path 102, the document P is delivered to a delivery roller 103 provided properly and the first face of the document P is read by image reading means such as a CCD or a CIS when passing through a reading position X. When a sensor detects a trailing end of the document P having the first face read, a sheet discharge roller 104 is stopped in such a state as to nip the vicinity of the trailing end of the document.

As shown in FIG. 20, when the sheet discharge roller 104 is rotated reversely, the document P is delivered to a switchback path 105. The document P advances to an upstream side of the reading position X of the delivery path 102 from the switchback path 105 again. Consequently, the leading and trailing end of the document Pare inverted. When the document P is delivered by means of the delivery roller 103 and passes through the reading position X, a second face of the document P is read by the image reading means. When the sensor detects the trailing end of the document P having the second face read, the sheet discharge roller 104 is stopped in such a state as to nip the vicinity of the trailing end of the document P again and the document P is then fed reversely through the switchback path 105. The document P advancing to the delivery path 102 from the switchback path 105 again is brought into a state in which the leading and the trailing end are inverted again, that is, a state in which the first face is opposed to the reading position X. Thereafter, the document P is delivered through the delivery path 102 and the first face is turned downward so that the document P is discharged to a sheet discharge tray 106. Consequently, both the first and second faces of the document P are read, and furthermore, the document P is discharged to the sheet discharge tray 106 in loading order onto the sheet feed tray 100.

In such an image reading apparatus comprising the ADF, it has been known that there is generated a so-called skew in which the document is tilted with respect to a delivery direction when the document is to be delivered. There are various causes for the skew, that is, a tilt is generated when the document is to be mounted on the sheet feed tray 100, an individual variation in the sheet feed roller 101 and the delivery roller 103 is generated, and a difference in a degree of smoothness of the surface and back face of the document is made. In the double side reading operation, the delivery distance of the document is increased so that the skew is generated easily. In some cases in which the degrees of smoothness of the surface and back face of the document are different from each other, moreover, the skew is easily generated on one of the surface and the back face.

For example, in the case in which the skew is not generated when the image of the first face of the document is to be read but is generated when the image of the second face is to be read as shown in FIG. 21, image data having different degrees of the tilt of the image are created on the surface and back face of the document. If both sides are copied by using such image data, the degrees of the tilt of the image are different from each other between the surface and the back face for each recording sheet. Consequently, there is a problem in that an image for each page has no unification and a poor impression is given.

SUMMARY

Aspects of the invention provide an image reading apparatus being capable of preventing a skew from being generated on a surface and a back face of a document and capable of reading both sides of the document.

BRIEF DESCRIPTION OF THE DRAWINGS

FIG. 21 is a schematic view showing a document having a skew.

DETAILED DESCRIPTION

[General Overview]

Figure 1:
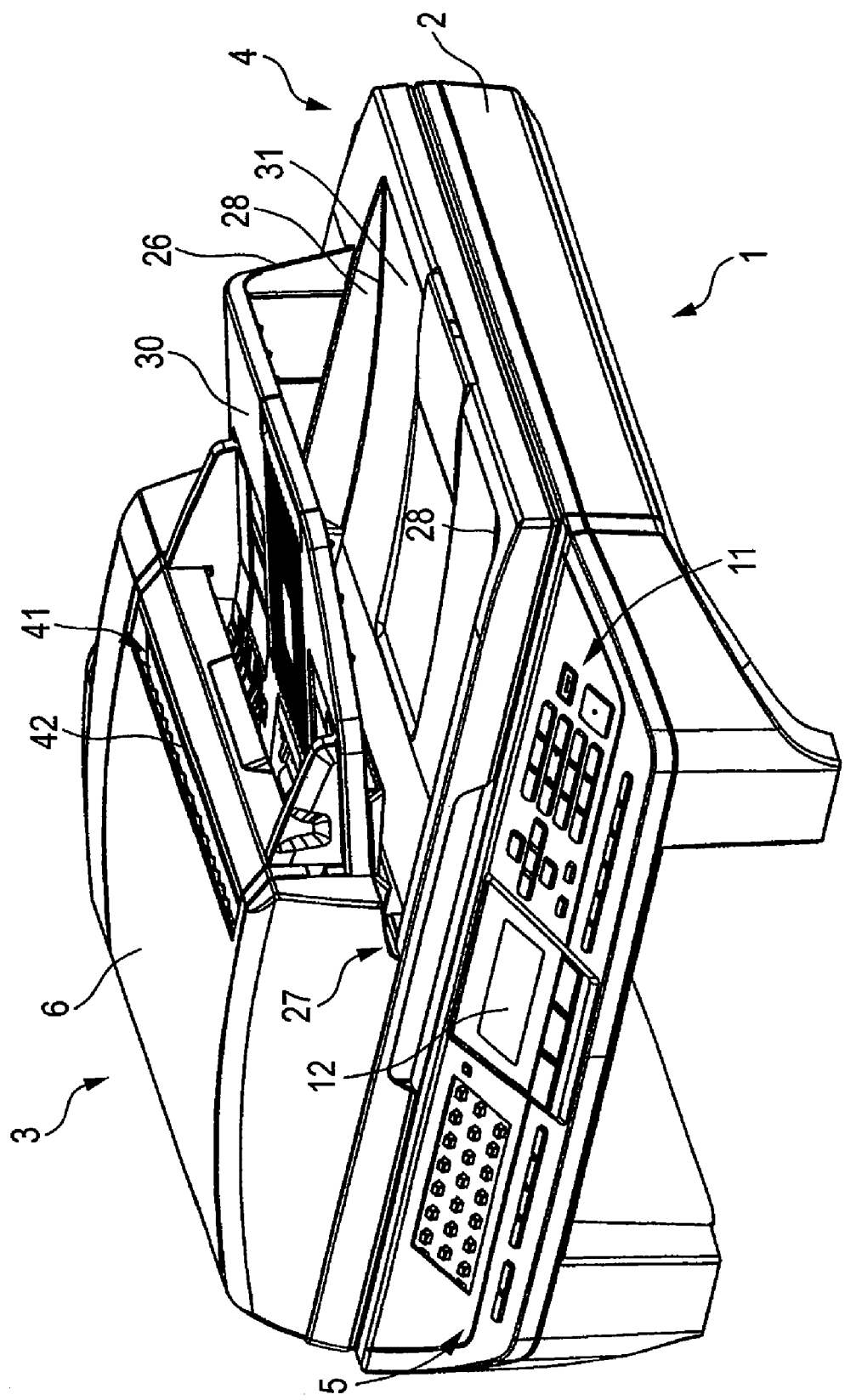
FIG. 1 is a perspective view showing a structure of an outer appearance of an image reading apparatus according to an aspect of the invention.

According to an aspect of the invention, there is provided an image reading apparatus comprising: a document delivery path that couples, through a reading position, a document mounting portion for mounting a document from which an image is to be read and a document discharging portion for discharging the document from which the image has been read; a switchback delivery path coupled to a predetermined position of the document delivery path and inverting a leading and a trailing end in the document, thereby returning the document from a downstream side of the reading position to an upstream side of the reading position; an image reading unit that reads the image of the document delivered in the reading position of the document delivery path; a skew detecting unit that detects a skew of the document passing through the reading position; and a control unit that delivers the document to the switchback delivery path to read both sides of the document again when the skew detecting unit detects the skew of the document.

The document having both sides to be read is mounted on the document mounting portion. When the both sides are started to be read, the documents mounted on the document mounting portion are fed one by one to the document delivery path. The document fed to the document delivery path is delivered through the document delivery path with a first face (a surface) opposed to the reading position, and an image is read from the first face by the image reading unit. The document passing through the reading position is guided to the switchback delivery path. The document entering the switchback delivery path from the downstream side of the reading position is returned to the upstream side of the reading position in the document delivery path with the leading and the trailing end inverted. The document returned to the document delivery path is delivered with a second face (a back face) opposed to the reading position and an image is read from the second face by the image reading unit. The document having the second face from which the image is read is guided to the switchback delivery path again in such a manner that directions of the surface and the back face in the document discharging portion are coincident with a mounting state on the document mounting portion, and is returned to the upstream side of the reading position of the document delivery path with the leading and the trailing end inverted. The document returned to the document delivery path is delivered with the first face opposed to the reading position. In the case in which the skew detecting unit does not detect the skew of the document, the document is discharged to the document discharging portion.

The skew detecting unit detects the skew of the document passing through the reading position. In the case in which the skew detecting unit detects the skew of the document, the image is read from the second face so that the control unit causes the image reading unit to read the image from the first face of the document returned from the switchback delivery path to the document delivery path. Then, the document having the first face from which the image has been read is guided to the switchback delivery path again and is returned to the upstream side of the reading position of the document delivery path with the leading and the trailing end inverted. Thereafter, the image reading unit is caused to read the image from the second face of the document returned to the document delivery path. The document having the second face from which the image has been read is guided to the switchback delivery path again and is returned to the upstream side of the reading position of the document delivery path with the leading and the trailing end inverted in such a manner that the directions of the surface and the back face in the document discharging portion are coincident with the mounting state on the document mounting portion. The document returned to the document delivery path is delivered with the first face opposed to the reading position. In the second double side reading operation, in the case in which the skew detecting unit does not detect the skew of the document, the document is discharged to the document discharging portion.

In the case in which the skew detecting unit detects that the document passing through the reading position has the skew again, the control unit reads the images of the first and second faces of the document again in the same manner. The control unit repeats the operation until the skew detecting unit does not detect that the document has the skew. Consequently, it is possible to read both sides of the document which has no skew.

According to another aspect of the invention, the control unit may serve to discharge the document to the document discharging portion and to give an error notice when the skew detecting unit detects the skew of the document a predetermined number of times or more.

In the case in which the skew of the document is not improved even if the control unit reads the images of the first and second faces of the document at a predetermined number of times, consequently, it is possible to give the error notice, thereby causing a user to recognize that a delivery has an abnormality. The error notice includes a method of displaying the purport that the skew cannot be eliminated or that a reading error is made on a display screen provided in an operating portion and causing a user to visually recognize the error, a method of making a sound indicative of an error, thereby causing the user to carry out a visual recognition, and a method of informing a maintenance trader of the generation of an error through a communication line, for example.

According to still another aspect of the invention, the document delivery path may be provided with skew correcting unit for correcting the skew of the document.

Consequently, the skew of the document is corrected before the document passing through the reading position is returned from the switchback delivery path to the document delivery path and passes through the reading position again.

By repetitively reading the image of the document, therefore, it is possible to read the images of both sides of the document having no skew.

According to still another aspect of the invention, the image reading unit may be a line sensor for setting a transverse direction of the document delivery path to be a scanning line, and the skew detecting unit serves to determine that a skew is present if the number of read lines of a document read by the image reading unit is equal to or greater than a predetermined number of lines.

According to still another aspect of the invention, the image reading unit may be a line sensor for setting a transverse direction of the document delivery path to be a scanning line, and the skew detecting unit serves to determine that a skew is present if a difference between the number of read lines of a first face and the number of read lines of a second face in a document read by the image reading unit is equal to or greater than a predetermined number of lines.

According to still another aspect of the invention, the skew detecting unit may be configured by disposing a plurality of document sensors at intervals for detecting a presence of a document in a transverse direction of the document delivery path, and serves to determine that a skew is present if a tune difference between document detection timings of the document sensors is equal to or greater than a predetermined time difference.

According to still another aspect of the invention, the skew correcting unit may be suitably implemented by a register mechanism for causing a leading end of a document to hit against a delivery roller disposed in the document delivery path, thereby flexing the document.

According to still another aspect of the invention, the skew correcting unit may be suitably implemented by a register mechanism for flexing a document based on a difference in a circumferential speed between a pair of delivery rollers disposed apart from each other in a delivery direction in the document delivery path or the switchback delivery path.

According to the above-described image reading apparatus, in the case in which the skew detecting unit detects the skew of the document in the operation for reading the both sides which is to be carried out by returning the document from the switchback delivery path to the document delivery path, the document is returned from the switchback delivery path to the document delivery path again, thereby reading both sides. Consequently, it is possible to read both sides of the document having no skew.

An aspect of the invention will be described below with reference to the drawings. It is apparent that the aspect is a simple example of the invention and can be properly changed without departing from the scope of the invention.

Figure 2:
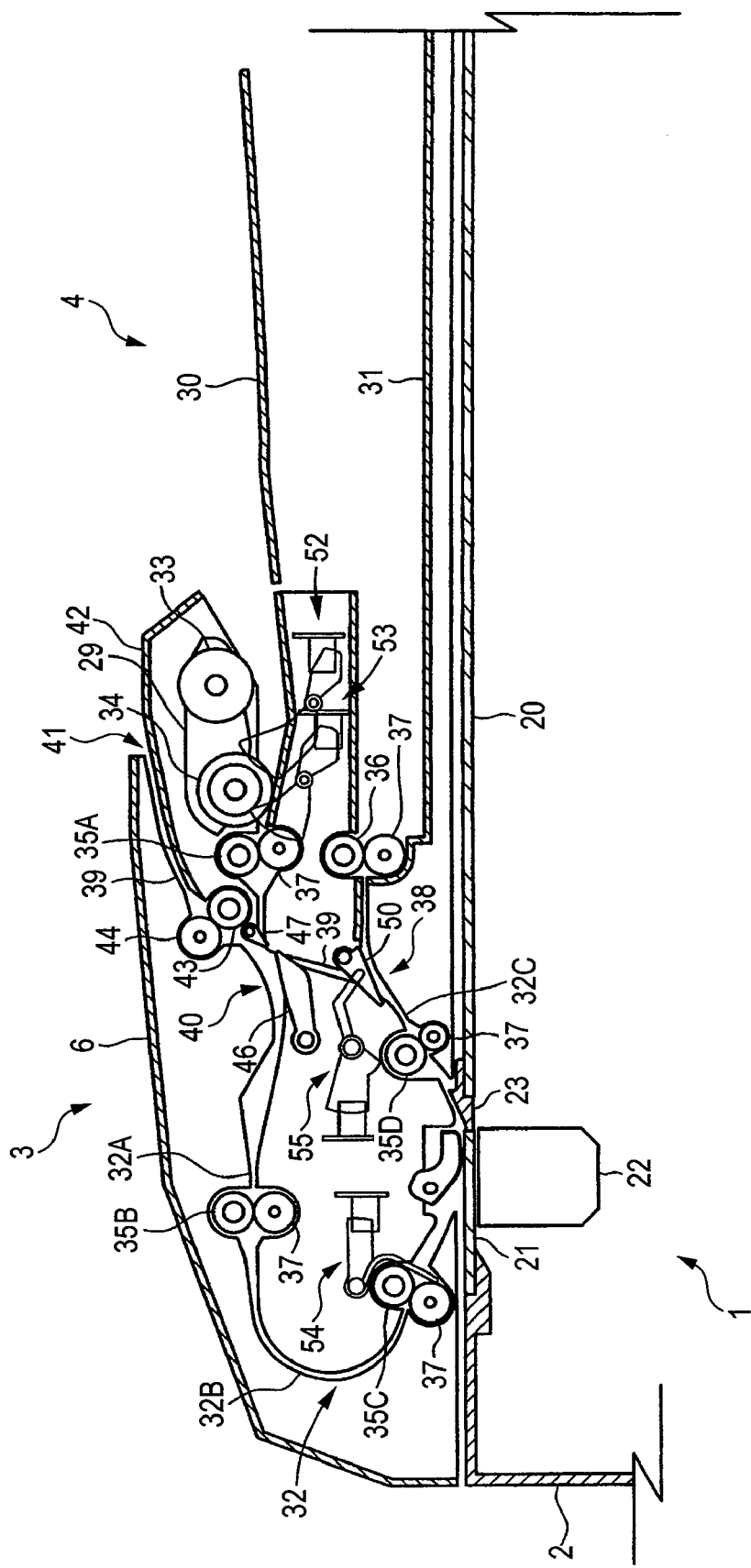
FIG. 2 is a longitudinal sectional view showing an internal structure of the image reading apparatus.

FIGS. 1 and 2 show a main structure of an image reading apparatus 1 according to the aspect of the invention. The image reading apparatus 1 is implemented as an image reading portion for reading an image of a document in a copying device, a facsimile device, a scanner device, or a multi function device (MFD) having a copy function, a facsimile function and a scanner function, for example.

As shown in FIGS. 1 and 2, in the image reading apparatus 1, a document cover 4 including an auto document feeder (ADF) 3 to be an automatic document delivery mechanism is attached openably to a document mounting table 2 functioning as an FBS (Flatbed Scanner) through a hinge on a back side (behind a sheet).

An operation panel 5 is provided on a front side of the document mounting table 2. The operation panel 5 includes various operation keys 11 and a liquid crystal display portion 12. A user inputs a desirable command by using the operation panel 5. The image reading apparatus 1 carries out a predetermined operation upon receipt of a predetermined input. The image reading apparatus 1 is also operated in accordance with a command connected to a computer and transmitted from the computer through a printer driver or a scanner driver in addition to the command input to the operation panel 5.

As shown in FIG. 2, the document mounting table 2 is provided with platen glasses 20 and 21 on a top face opposed to the document cover 4. When the document cover 4 is opened, the platen glasses 20 and 21 are exposed as upper surfaces of the document mounting table 2. When the document cover 4 is closed, the upper surface of the document mounting table 2 including the platen glasses 20 and 21 is covered. An image reading unit 22 is provided in the document mounting table 2 opposite to the platen glasses 20 and 21.

The platen glass 20 serves to mount a document when the image reading apparatus 1 is used as the FBS, and is formed by a transparent glass plate, for example. An opening for exposing the platen glass 20 is formed on a center of the upper surface of the document mounting table 2. A region of the platen glass 20 exposed from the opening serves as a document reading region in the FBS.

The platen glass 21 is placed in a reading position in the case in which the ADF 3 of the image reading apparatus 1 is used, and is formed by a transparent glass plate, for example. An opening for exposing the platen glass 21 is formed in the reading position of the document mounting table 2. The platen glass 21 exposed from the opening is extended in a far direction of the image reading apparatus 1 corresponding to a length in a main scanning direction of the image reading unit 22.

A positioning member 23 is provided between the platen glass 20 and the platen glass 21. The positioning member 23 is a long plate-shaped member extended in the far direction of the image reading apparatus 1 in the same manner as the platen glass 21. The positioning member 23 is used as a positioning reference for a document when the document is to be mounted on the platen glass 20 to be a document mounting surface in the FBS. For this reason, a central position and positions of both ends of various document sizes such as an A4 size and a B5 size are displayed on the upper surface of the positioning member 23. The upper surface of the positioning member 23 is provided with a guide surface for deflecting the document passing over the platen glass 21 by the ADF 3 to be scooped and returning the document to the ADF 3.

The image reading unit 22 is a so-called line image sensor for irradiating a light on the document through the platen glasses 20 and 21 from a light source and collecting the light reflected from the document into a light receiving unit through a lens, thereby converting the light into an electric signal. The image reading unit 22 serves to read an image of the document delivered over the platen glass 21 by means of the ADF 3 by setting a transverse direction of a document delivery path 32 of the ADF 3 as a scanning line. For the image reading unit 22, it is possible to use a contact type CIS (Contact Image Sensor) and a reduced optical system CCD (Charge Coupled Device) image sensor, for example. The image reading unit 22 is provided reciprocably under the platen glasses 20 and 21 by means of a belt driving mechanism to be a scanning mechanism and is reciprocated in parallel with the platen glasses 20 and 21 upon receipt of a driving force of a carriage motor.

The document cover 4 is provided with the ADF 3 for sequentially delivering the document from a sheet feed tray 30 (a document mounting portion) to a sheet discharge tray 31 (a document discharging portion) through the document delivery path 32. In a delivering process to be carried out by the ADF 3, the document passes through the reading position on the plate glass 21 and the image reading unit 22 standing by under the platen glass 21 reads the image of the document.

As shown in FIGS. 1 and 2, the document cover 4 is provided with the sheet feed tray 30 and the sheet discharge tray 31 in two stages, that is, upper and lower stages with the sheet feed tray 30 disposed on an upper side. The document from which an image is to be read by the ADF 3 is mounted on the sheet feed tray 30. A plurality of documents is mounted on the sheet feed tray 30 in such a manner that leading ends in a sheet feeding direction are inserted into the sheet delivery path 32 in a stacking state with a first face turned upward. A back side of the apparatus in the sheet feed tray 30 is bent downward so that a protecting wall 26 is formed. A lower end of the protecting wall 26 is coupled to the upper surface of the document cover 4. By the protecting wall 26, it is possible to prevent the document mounted on the sheet discharge tray 31 from dropping when the document cover 4 is opened with respect to the document mounting table 2. In a lower part on the front side of the apparatus in the sheet feed tray 30, a notch 27 is formed in a part of a housing of the ADF 3. By the notch 27, it is possible to enhance a visibility from the front side of the apparatus of the document discharged to the sheet discharge tray 31. In particular, a document having a small size is visually recognized by the sheet feed tray 30 with difficulty. However, a space between the sheet feed tray 30 and the sheet discharge tray 31 is enlarged by means of the notch 27. Consequently, it is possible to particularly enhance the visibility of the document having the small size.

The sheet discharge tray 31 is placed in a position separated in a vertical direction on a lower side of the sheet feed tray 30, and is formed integrally with the upper surface of the document cover 4. The document from which an image is read and which is discharged from the ADF 3 is held to be loaded on the sheet discharge tray 31 with the first face turned downward in a separating state from the document mounted on the sheet discharge tray 30. Both side portions 28 to be front and back sides of the apparatus in the sheet discharge tray 31 are slant faces turned upward toward both sides. By the both side portions 28, it is possible to slide and pull out the document discharged to the sheet discharge tray 31 along the slant faces of the both side portions 28 in order to press the document from above when it is taken out. Therefore, it is possible to easily take the document out of the sheet discharge tray 31.

As shown in FIG. 2, in the ADF 3, the horizontal document delivery path 32 taking an almost U shape seen in a longitudinal section is formed in such a manner that the sheet feed tray 30 and the sheet discharge tray 31 are coupled to each other through the reading position on the platen glass 21. The document delivery path 32 is continuously formed as a passage having a predetermined width through which the document can pass by means of a member constituting an ADF body, a guide plate or a guide rib. Thus, the sheet feed tray 30 and the sheet discharge tray 31 are provided in the two stages, that is, the upper and lower stages, and the horizontal document delivery path 32 taking the almost U shape is formed as seen in the longitudinal section so as to couple them. Consequently, the width of the ADF 3 can be reduced to decrease a size.

The document delivery path 32 is extended from the sheet feed tray 30 toward one end side (a left side in FIG. 2) of the document cover 4 and is subsequently curved to be inverted downward to reach the reading position on the platen glass 21, and takes an almost U shape in a horizontal direction as seen in the longitudinal section which is extended from the reading position toward the sheet discharge tray 31. The document delivery path 32 is roughly divided into three parts including upper and lower portions 32A and 32C forming a straight portion in two stages, that is, upper and lower stages in the almost U shape, and a curved portion 32B curved to link the upper portion 32A and the lower portion 32C. The document delivery path 32 is used as a delivery path of a document for both a single side reading operation and a double side reading operation which are to be carried out by the ADF 3.

A sheet feeding unit for sequentially feeding the document mounted on the sheet feed tray 30 is provided in the vicinity of the sheet feed tray 30 in the sheet delivery path 32. Moreover, the document delivery path 32 is provided with a document delivering unit for delivering the document from the sheet feed tray 30 to the sheet discharge tray 31. Specifically, as shown in the drawing, the feeding unit is constituted by a pickup roller 33 and a separating roller 34 which are provided in the document delivery path 32 respectively and the document delivering unit is constituted by delivery rollers 35A, 35B, 35C and 35D and a sheet discharge roller 36, and pinch rollers 37 to come in pressure contact therewith. A driving force is transmitted from a motor 67 (see FIG. 6) to be a driving source to each of the rollers constituting the feeding unit and the document delivering unit.

As shown in the drawing, the pickup roller 33 and the separating roller 34 are provided in the vicinity of the most upstream of the document delivery path 32. The pickup roller 33 is rotatably provided in a tip portion of an arm 29 having a base end side supported pivotally on a shaft for pivotally supporting the separating roller 34. The separating roller 34 is rotatably provided in a position placed apart in a sheet feeding direction from the pickup roller 33 so as to abut on an opposed surface of the document delivery path 32. The driving force is transmitted from the motor 67 to the pickup roller 33 and the separating roller 34 so that they are rotated and driven, and the driving force is also transmitted from the motor 67 to the arm 29 so that the arm 29 is moved vertically. The pickup roller 33 and the separating roller 34 have diameters which are equal to each other, and are rotated at an equal circumferential speed. A separating pad for separating the document by a friction is provided in an opposed position to the separating roller 34 in pressure contact with a roller face of the separating roller 34.

The delivery rollers 35A, 35B, 35C and 35D are provided in different positions of the document delivery path 32, respectively. In the aspect, the delivery roller 35A is provided on a directly downstream side of the separating roller 34, the delivery roller 35B is provided in an upper portion 32A of the document delivery path 32, the delivery roller 35C is provided in a lower portion 32C of the document delivery path 32 on a directly upstream side of the reading position, and the delivery roller 35D is provided in the lower portion 32C of the document delivery path 32 on a directly downstream side of the reading position. The arrangement is illustrative and the number and arrangement of the delivery rollers 35A, 35B, 35C and 35D can be changed properly.

A pinch roller 37 is provided in each of the opposed positions to the delivery rollers 35A, 35B, 35C and 35D. Each pinch roller 37 has a shaft urged elastically by a spring and is thus caused to come in pressure contact with the roller face of each of the delivery rollers 35. When each of the delivery rollers 35A, 35B, 35C and 35D is rotated, the pinch roller 37 is also rotated together therewith. The document is caused to come in pressure contact with each of the delivery rollers 35 by each pinch roller 37 so that a rotating force of each of the delivery rollers 35A, 35B, 35C and 35D is transmitted to the document.

The sheet discharge roller 36 is provided in the vicinity of the most downstream of the document delivery path 32, and the driving force is transmitted from the motor 67 so that the sheet discharge roller 36 is rotated and driven in the same manner as the delivery rollers 35A, 35B, 35C and 35D. The pinch roller 37 is also provided in an opposed position to the sheet discharge roller 36, and the pinch roller 37 is urged elastically by means of the spring and is thus caused to come in pressure contact with the sheet discharge roller 36.

A switchback path 39 (a switchback delivery path) is coupled to a coupling position 38 in the lower portion 32C of the document delivery path 32. The switchback path 39 serves to invert a leading and a trailing end in the document having a first face read in the reading position, thereby returning the document from the downstream side of the reading position to the document delivery path 32 on the upstream side when the double side reading operation is carried out. The switchback path 39 is extended obliquely and upward from the coupling position 38 toward the upper side of the sheet feed tray 30 and crosses the upper portion 32A of the document delivery path 32. The document subjected to the switchback delivery from a crossing position 40 of the upper portion 32A and the switchback path 39 is returned to the document delivery path 32.

A terminal 41 of the switchback path 39 is opened to an external surface of the ADF 3. A document support portion 42 is formed from the terminal 41 of the switchback path 39 to the sheet feed tray 30 side so as to be linked from the terminal 41. The document support portion 42 serves to support the document protruded from the terminal 41 of the switchback path 39, and constitutes an upper cover 6 of the ADF 3 at an upper side of the sheet feed roller 33 and the separating roller 34. The upper cover 6 is formed to wholly cover the ADF 3 including the sheet feed roller 33 and the separating roller 34 and constitutes a housing (an apparatus housing) of the ADF 3. The document support portion 42 constituted as the upper cover 6 is extended from the terminal 41 toward the sheet feed tray 30 side to reach the upstream side of a sheet feeding position through the sheet feed roller 33 and the separating roller 34. In the double side reading operation, consequently, a part of the document entering the switchback path 39 and protruded from the terminal 41 toward the outside of the ADF 3 is supported on the document support portion 42. Therefore, the document can be prevented from being suspended at a downstream side (the right side in FIG. 2) from the sheet feeding position of the document loaded onto the sheet feed tray 30, and can be thus prevented from being disturbed in the sheet feeding position.

A switchback roller 43 is provided on the terminal 41 side from the crossing position 40 of the switchback path 39. The driving force is transmitted from the motor 67 to the switchback roller 43 so that the switchback roller 43 is rotated and driven in both normal and reverse directions. A pinch roller 44 is provided in an opposed position to the switchback roller 43. The pinch roller 44 has a shaft urged elastically by means of a spring and is thus caused to come in pressure contact with a roller face of the switchback roller 43 and is rotated together with the rotation of the switchback roller 43. The document is caused to come in pressure contact with the switchback roller 43 by means of the pinch roller 44 so that the rotating force of the switchback roller 43 is transmitted to the document. By the switchback roller 43 and the pinch roller 44, a switchback delivery unit for switchback delivering the document is implemented.

While the switchback path 39 coupled to the coupling position 38 on the downstream side of the reading position of the document delivery path 32 is caused to cross the upper portion 32A of the document delivery path 32, and the switchback roller 43 is provided on the terminal 41 side from the crossing position 40 in the aspect, the delivery passage of the switchback path 39 is optional and it is possible to properly change the delivery passage for the switchback path which is coupled to a predetermined position of the document delivery path 32 and serves to invert the leading and the trailing end in the document from the downstream side of the reading position and to return the document to the upstream side of the reading position.

Figure 3:
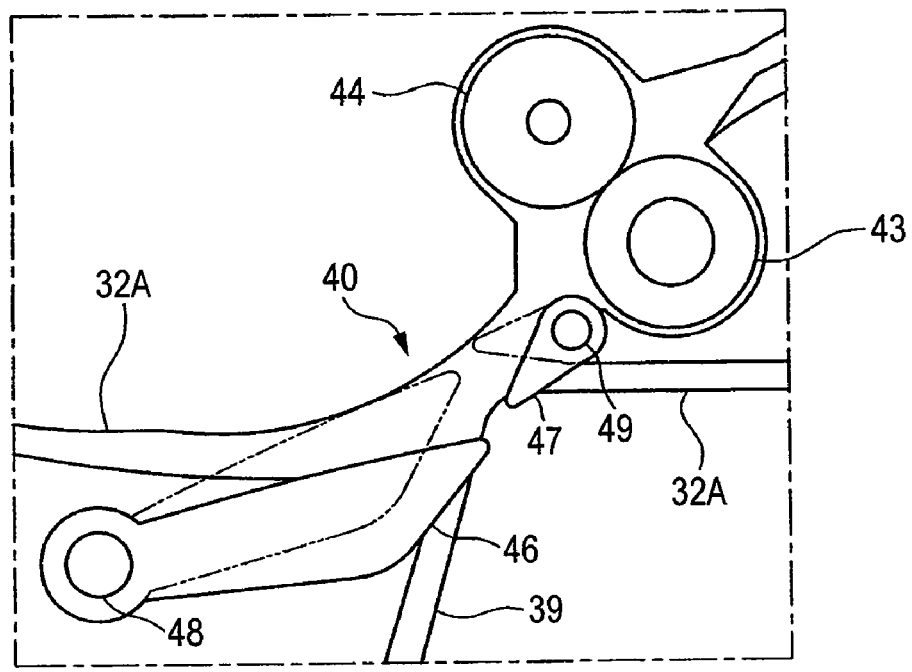
FIG. 3 is an enlarged view showing a structure of a crossing position.

As shown in FIGS. 2 and 3, a guide flap 46 and a guide flap 47 which serve to guide the document to a desirable delivery path are provided in the crossing position 40. The guide flap 46 is provided rotatably within a predetermined range around a shaft 48 provided in a corner portion (a left and lower side in FIG. 3) on the reading position side of the document delivery path 32 and the coupling position 38 side of the switchback path 39 in the crossing position 40. The guide flap 46 is a blade-shaped plate and has a tip protruded to the crossing position 40. Although only one guide flap 46 is shown in the drawing, a plurality of guide flaps 46 taking the same shape is provided at a predetermined interval in a transverse direction of the document delivery path 32 (a perpendicular direction to the sheet in FIG. 3, a far direction of the apparatus). The guide flaps 46 are rotated integrally.

The guide flap 46 changes a posture into a third guide posture shown in a solid line and a fourth guide posture shown in a two-dotted chain line in FIG. 3 by a rotation around the shaft 48. The guide flap 46 abuts on the document delivery path 32 or a guide member of the switchback path 39, for example, and is thus controlled to be rotated downward from the third guide posture and to be rotated upward from the fourth guide posture. The guide flap 46 takes the third guide posture so that a delivery path from the sheet feed tray 30 side (a right side in FIG. 3) of the document delivery path 32 to a reading position side (a left side in FIG. 3) is provided continuously, and furthermore, a delivery path from the document delivery path 32 to the coupling position 38 side (a lower side in FIG. 3) of the switchback path 39 is closed. Consequently, the document reaching the crossing position 40 from the sheet feed tray 30 side of the document delivery path 32 is permitted to enter the reading position side of the document delivery path 32 and is prohibited to enter the coupling position 38 side of the switchback path 39. Moreover, the document reaching the crossing position 40 from the terminal 41 side (an upper side in FIG. 3) of the switchback path 39 is permitted to enter the reading position side of the document delivery path 32 and is prohibited to enter the coupling position 38 side of the switchback path 39.

When the guide flap 46 takes the fourth posture, a delivery path from the coupling position 38 side of the switchback path 39 to the terminal 41 side is provided continuously, and furthermore, a delivery path from the coupling position 38 side of the switchback path 39 to the reading position side of the document delivery path 32 is closed. Consequently, the document reaching the crossing position 40 from the coupling position 38 side of the switchback path 39 is permitted to enter the terminal 41 side of the switchback path 39 and is prohibited to enter the reading position side of the document delivery path 32.

The delivery path is switched by the guide flap 46 through an abutment of the document. The guide flap 46 always takes the third guide posture shown in a solid line of FIG. 3 by a dead weight thereof or upon receipt of an urging force of an elastic member such as a spring. The document delivered from the coupling position 38 toward the crossing position 40 through the switchback path 39 abuts on the guide flap 46 so that the guide flap 46 is rotated to be pushed upward in the drawing and thus takes the fourth guide posture shown in the two-dotted chain line of FIG. 3. On the other hand, the document delivered from the terminal 41 side of the switchback path 39 to the crossing position 40 abuts on the guide flap 46 and the guide flap 46 is controlled so as not to be rotated downward from the third guide posture. For this reason, the document is guided to the guide flap 46 and enters the reading position side through the upper portion 32A of the document delivery path 32. The shape of the blade of the guide flap 46 easily changes the posture by the abutment of the document delivered from the coupling position 38 side of the switchback path 39 to the crossing position 40, and there is employed such a shape that the document delivered from the terminal 41 side of the switchback path 39 to the crossing position 40 is easily guided to the reading position side of the document delivery path 32. If the posture of the guide flap 46 is changed by the abutment of the document, thus, the guide flap 46 does not need to positively change the posture by the application of the driving force from the motor 67. Therefore, it is possible to implement the guide flap 46 with a simple structure.

The guide flap 47 is provided rotatably within a predetermined range around the shaft 49 provided in the corner portion (the right and upper side in FIG. 3) of the sheet feed tray 30 side of the document delivery path 32 and the terminal 41 side of the switchback path 39 in the crossing position 40. The guide flap 47 is a blade-shaped plate and has a tip protruded to the crossing position 40. Although only one guide flap 47 is shown in the drawing, a plurality of guide flaps 47 taking the same shape is provided at a predetermined interval in the transverse direction of the document delivery path 32. The guide flaps 47 are rotated integrally.

The guide flap 47 changes a posture into a fifth guide posture shown in a solid line and a sixth guide posture shown in a two-dotted chain line in FIG. 3 by a rotation around the shaft 49. The guide flap 47 abuts on the document delivery path 32 or the guide member of the switchback path 39, for example, and is thus controlled to be rotated rightward from the fifth guide posture and to be rotated upward from the sixth guide posture. The guide flap 47 takes the fifth guide posture so that a delivery path from the terminal 41 side of the switchback path 39 to the reading position side of the document delivery path 32 is provided continuously, and furthermore, a delivery path from the coupling position 38 side of the switchback path 39 to the sheet feed tray 30 side of the document delivery path 32 is closed. Consequently, the document reaching the crossing position 40 from the terminal 41 side of the switchback path 39 is permitted to enter the reading position side of the document delivery path 32 and is prohibited to enter the sheet feed tray 30 side. Moreover, the document reaching the crossing position 40 from the coupling position 38 side of the switchback path 39 is permitted to enter the terminal 41 side of the switchback path 39 and is prohibited to enter the sheet feed tray 30 side of the document delivery path 32.

When the guide flap 47 takes the sixth guide posture, a delivery path from the sheet feed tray 30 side of the document delivery path 32 to the reading position side is provided continuously, and furthermore, a delivery path from the sheet feed tray 30 side of the document delivery path 32 to the terminal 41 side of the switchback path 39 is closed. Consequently, the document reaching the crossing position 40 from the sheet feed tray 30 side of the document delivery path 32 is permitted to enter the reading position side of the document delivery path 32 and is prohibited to enter the terminal 41 side of the switchback path 39.

The delivery path is switched by the guide flap 47 through an abutment of the document. The guide flap 47 always takes the fifth guide posture shown in the solid line of FIG. 3 by a dead weight thereof or upon receipt of an urging force of an elastic member such as a spring. The document delivered from the sheet feed tray 30 side of the document delivery path 32 abuts on the guide flap 47 so that the guide flap 47 is rotated to be pushed leftward in the drawing and thus takes the sixth guide posture shown in the two-dotted chain line of FIG. 3. On the other hand, even if the document delivered from the coupling position 38 side of the switchback path 39 to the crossing position 40 abuts on the guide flap 47, the guide flap 47 is controlled so as not to be rotated rightward from the fifth guide posture. For this reason, the document is guided to the guide flap 47 and enters the terminal 41 side of the switchback path 39. The shape of the blade of the guide flap 46 easily changes the posture by the abutment of the document delivered from the sheet feed tray 30 side of the document delivery path 32 to the crossing position 40, and there is employed such a shape that the document delivered from the coupling position 38 side of the switchback path 39 to the crossing position 40 is easily guided to the terminal 41 side of the switchback path 39. If the posture of the guide flap 47 is changed by the abutment of the document, thus, the guide flap 47 does not need to positively change the posture by the application of the driving force from the motor 67. Therefore, it is possible to implement the guide flap 47 with a simple structure.

Figure 4:
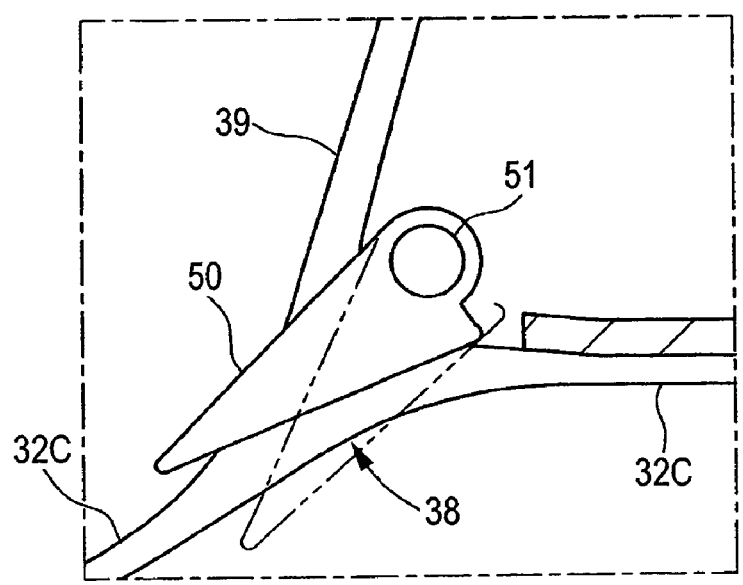
FIG. 4 is an enlarged view showing a structure of a coupling position.

As shown in FIGS. 2 and 4, a guide flap 50 is provided in the coupling position 38. The guide flap 50 is provided rotatably around a shaft 51, and the driving force is transmitted thereto from the motor 67 so that the guide flap 50 is rotated into a first guide posture shown in a solid line and a second guide posture shown in a two-dotted chain line in FIG. 4. By an abutment on the document delivery path 32 or the guide member of the switchback path 39, for example, the guide flap 50 is controlled to be rotated upward from the first guide posture and downward from the second guide posture. In the case in which the guide flap 50 takes the first guide posture, a delivery path from the reading position side (a left side in FIG. 4) of the document delivery path 32 to the sheet discharge tray 31 side (a right side in FIG. 4) is provided continuously. Consequently, the document passing through the reading position is guided from the lower portion 32C of the document delivery path 32 toward the sheet discharge tray 31 through the coupling position 38. In the case in which the guide flap 50 takes the second guide posture, a delivery path from a downstream side of the reading position of the lower portion 32C of the document delivery path 32 to the switchback path 39 is provided continuously. Consequently, the document passing through the reading position is guided through the coupling position 38 to enter the switchback path 39. Thus, the guide flap 50 is provided to freely guide the document in the coupling position 38 to either the document delivery path 32 or the switchback path 39. Although only one guide flap 50 is shown in the drawing, a plurality of guide flaps 50 taking the same shape is provided at a predetermined interval in the transverse direction of the document delivery path 32. The guide flaps 50 are rotated integrally.

As shown in FIG. 2, a plurality of sensors for detecting the delivery of the document is provided in the document delivery path 32 and the switchback path 39. Specifically, the document delivery path 32 is provided with a first front sensor 52 and a second front sensor 53 on upstream and downstream sides of the separating roller 34 respectively, and a rear sensor 54 is provided on a directly upstream side of the reading position. A switchback sensor 55 is provided between the coupling position 38 of the switchback path 39 and the crossing position 40. The sensors are so-called optical sensors and have the same structure except that shapes of detectors are varied due to a difference in a position for detection. Therefore, description will be given to the structure by taking the first front sensor 52 as an example.

Figure 5:
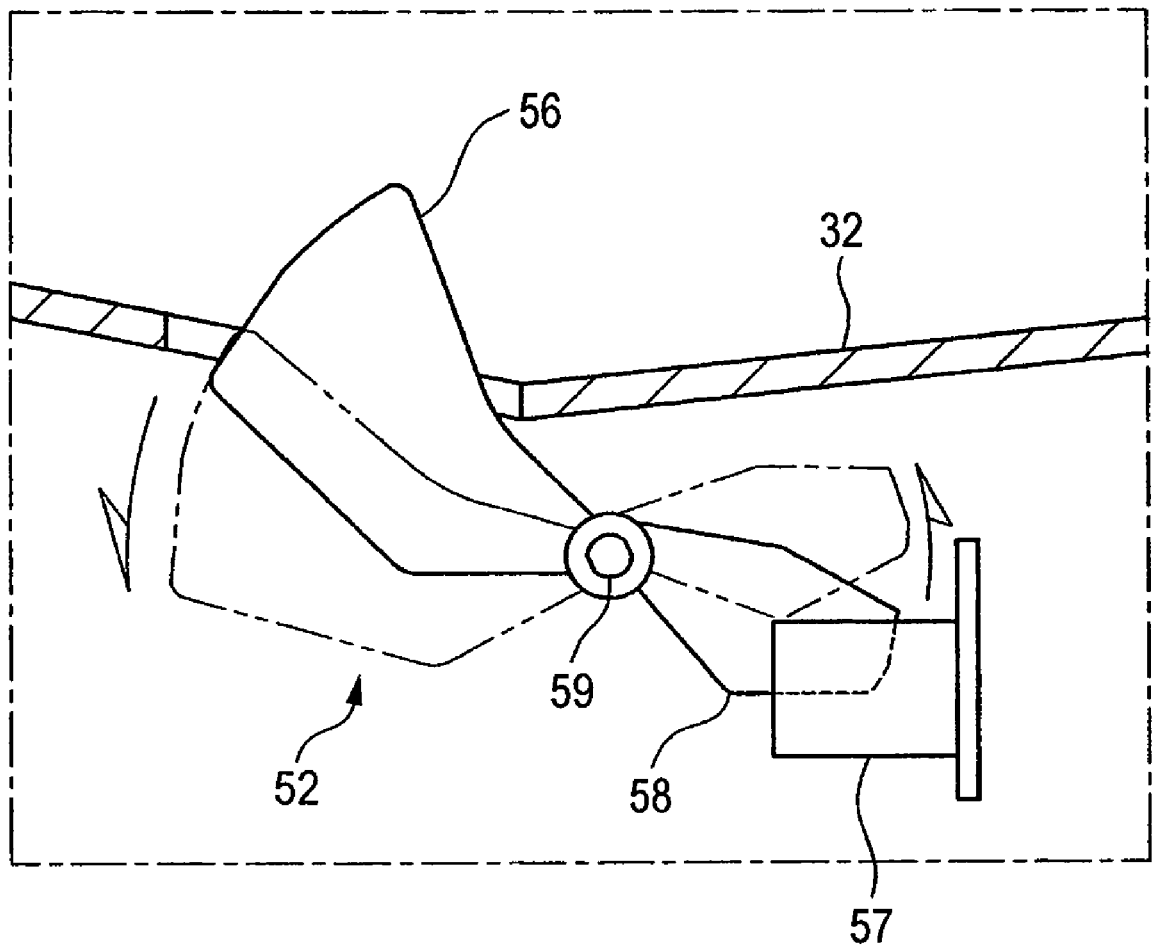
FIG. 5 is an enlarged view showing a structure of a first front sensor.

The first front sensor 52 is constituted by a detector 56 protruded from a lower surface of the document delivery path 32 and rotated to retreat from the document delivery path 32 by a contact with the document, and a photointerruptor 57 for detecting the rotation of the detector 56 as shown in FIG. 5. A shielding portion 58 to be detected by the photointerruptor 57 is formed integrally with the detector 56 and is provided rotatably around a shaft 59. The detector 56 is elastically urged to a position in which the detector 56 is protruded from the document delivery path 32, that is, in a clockwise direction in the drawing by an urging member such as a spring which is not shown. In a state in which an external force is not applied to the detector 56, the detector 56 is protruded from the document delivery path 32 and the shielding portion 58 is positioned between a light emitting portion and a light receiving portion in the photointerruptor 57 as shown in a solid line in the drawing. Consequently, a light transfer of the photointerruptor 57 is blocked so that the first front sensor 52 is turned OFF.

When the document is mounted on the sheet feed tray 30, the document abuts on the detector 56 to rotate the detector 56 to retreat from the document delivery path 32. The shielding portion 58 is also rotated together with the detector 56 and thus separates from the portion between the light emitting portion and the light receiving portion in the photointerruptor 57 as shown in a two-dotted chain line in the drawing. Consequently, the light transfer of the photointerruptor 57 can be prevented from being blocked so that the first front sensor 52 is turned ON. By the ON/OFF operations of the first front sensor 52, it is detected whether the document is mounted on the sheet feed tray 30 or not.

The second front sensor 53 provided on the directly downstream of the separating roller 34 serves to detect the leading or the trailing end in the document fed to the document delivery path 32 depending on the ON/OFF operations. For example, the second front sensor 53 monitors the numbers of rotations of the delivery rollers 35A, 35B, 35C and 35D after the detection of the trailing end of the document by means of an encoder or based on the number of steps of the motor 67, thereby determining a position of the leading or the trailing end of the document in the document delivery path 32.

The rear sensor 54 provided on the directly upstream of the reading position serves to detect the leading and the trailing end of the document delivered through the document delivery path 32 depending on the ON/OFF operations. The rear sensor 54 monitors the numbers of rotations of the delivery rollers 35A, 35B, 35C and 35D after the detection of the leading or the trailing end of the document by means of an encoder or based on the number of steps of the motor 67, thereby determining whether the leading or the trailing end of the document reaches the reading position or not. The image reading operation of the image reading unit 22 is controlled based on a signal of the rear sensor 54, and starts to read an image when the leading end of the document reaches the reading position and ends to read the image when the trailing end of the document reaches the reading position.

The switchback sensor 55 provided between the coupling position 38 of the switchback path 39 and the crossing position 40 serves to detect the leading or the trailing end of the document delivered through the switchback path 39 depending on the ON/OFF operations. For example, the switchback sensor 55 monitors the numbers of rotations of the delivery rollers 35A, 35B, 35C and 35D and the switchback roller 43 after the detection of the trailing end of the document by means of an encoder or based on the number of steps of the motor 67, thereby determining whether the trailing end of the document passes through the crossing position 40 or not.

Figure 6:
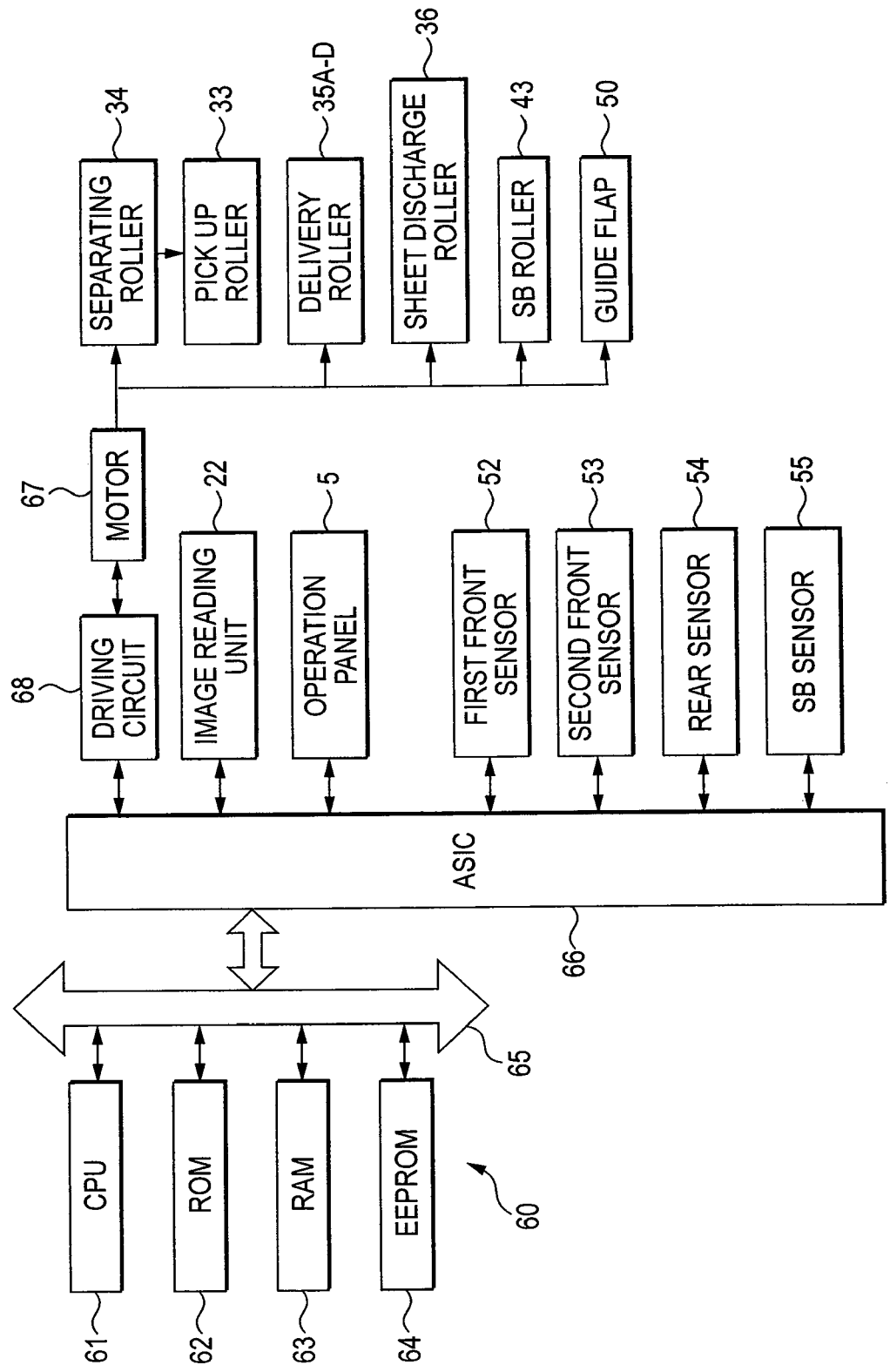
FIG. 6 is a block diagram showing a structure of a control portion.

FIG. 6 shows a structure of a control portion 60 (control unit) of the image reading apparatus 1. The control portion 60 is configured as a microcomputer which mainly includes a CPU 61, an ROM 62, an RAM 63 and an EEPROM (Electrically Erasable and Programmable ROM) 64 as shown in the drawing, and is connected to an ASIC (Application Specific Integrated Circuit) 66 through a bus 65.

The ROM 62 stores a program for controlling various operations of the image reading apparatus 1. The RAM 63 is used as a storage region or a working region for temporarily recording various data to be used when the CPU 61 executes the program. The EEPROM 64 is a storage region for storing various sets and flags which are to be held to be recorded also after a power supply is turned OFF.

The ASIC 66 generates a relative exciting signal to be conducted to the motor 67 in accordance with a command sent from the CPU 61 and sends the same signal to a driving circuit 68 of the motor 67, and sends a driving signal to the motor 67 through the driving circuit 68, thereby controlling the rotation of the motor 67. The motor 67 serves to apply the driving force to the pickup roller 33, the separating roller 34, the delivery rollers 35A, 35B, 35C and 35D, the sheet discharge roller 36, the switchback roller (SB roller) 43 and the guide flap 50 by a rotation in both normal and reverse directions, and is a driving source in the ADF 3.

The driving circuit 68 serves to drive the motor 67 and forms an electric signal for rotating the motor 67 upon receipt of a signal output from the ASIC 66. The motor 67 is rotated in a predetermined rotating direction at a predetermined rotating speed upon receipt of the electric signal and the rotating force of the motor 67 is transmitted to the pickup roller 33, the separating roller 34, the delivery rollers 35A, 35B, 35C and 35D, the sheet discharge roller 36, the switchback roller 43 and the guide flap 50 through a driving force transmitting mechanism, respectively.

The image reading unit 22 for reading the image of the document delivered to the reading position by the ADF 3 is connected to the ASIC 66. Based on a control program stored in the ROM 62, the image reading unit 22 reads the image of the document. A driving mechanism for reciprocating the image reading unit 22 is also operated upon receipt of a signal output from the ASIC 66, which is not shown.

The first front sensor 52, the second front sensor 53, the rear sensor 54 and the switchback sensor 55 are connected to the ASIC 66. The CPU 61 causes the ASIC 66 to send a predetermined output signal to operate the motor 67 and the image reading unit 22 based on the control program stored in the ROM 62 upon receipt of the ON/OFF operations of each of the sensors.

Figure 7:
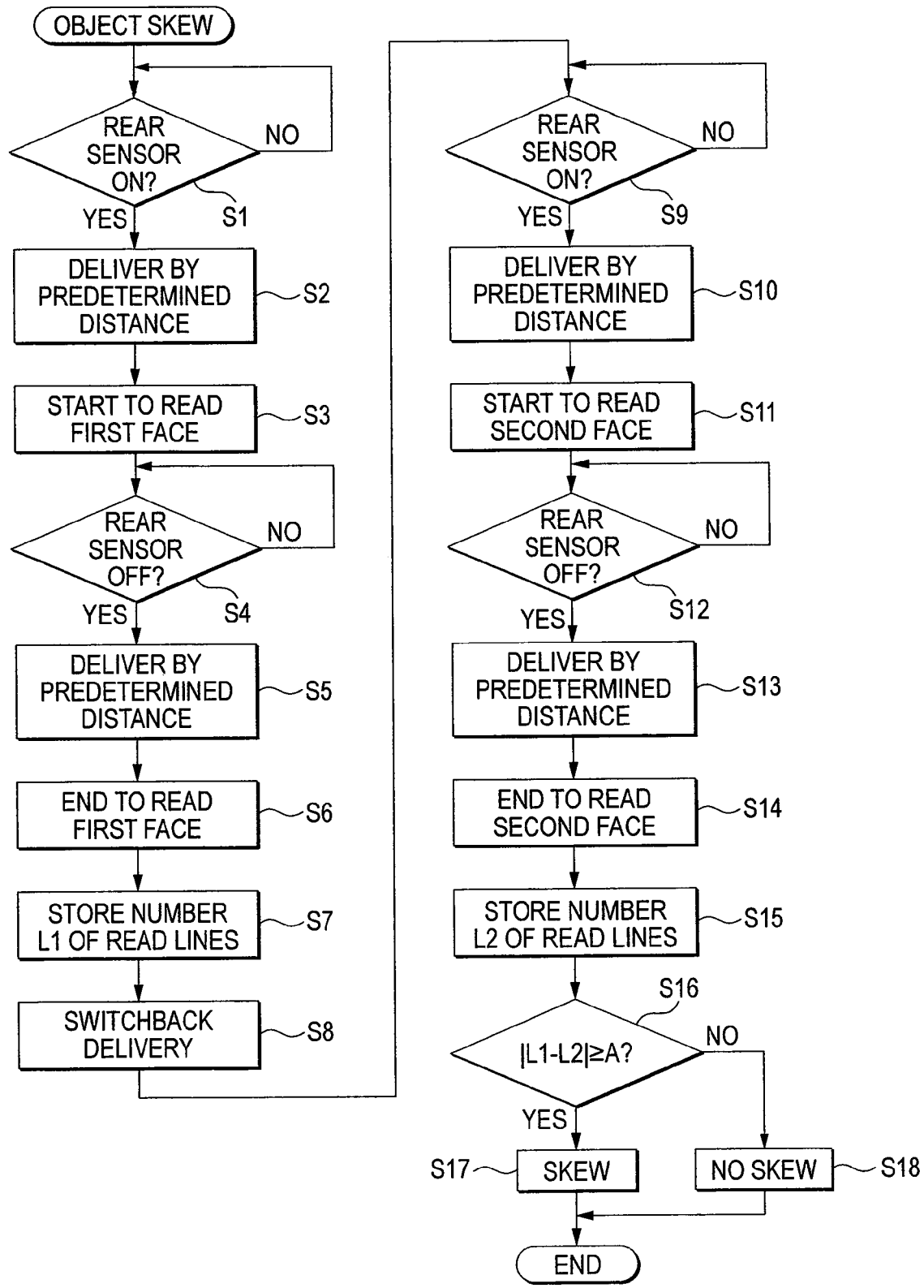
FIG. 7 is a flowchart showing a skew detecting method.

A skew detecting unit for detecting a skew of a document Gn passing through the reading position of the document delivery path 32 is implemented by the control portion 60, the image reading unit 22 and the rear sensor 54. As shown in FIG. 7, when a leading end of the document Gn delivered through the document delivery path 32 is detected by the rear sensor 54, the rear sensor 54 is turned ON (S1: Yes). When the leading end of the document Gn passes through a detecting position of the rear sensor 54 and is then delivered by a predetermined distance by means of the delivery roller 35C, it reaches the platen glass 21 (S2). The control portion 60 determines that the leading end of the document Gn reaches the reading position on the platen glass 21 based on the number of rotations of the motor 67 or a count of a time after the rear sensor 54 is turned ON, and starts to read an image of a first face of the document Gn by means of the image reading unit 22 (S3).

The rear sensor 54 is turned OFF when detecting a trailing end of the document Gn (S4: Yes). When the trailing end of the document Gn passes through the detecting position of the rear sensor 54 and is then delivered by a predetermined distance, it reaches the platen glass 21 (S5). The control portion 60 determines that the trailing end of the document Gn reaches the reading position on the platen glass 21 based on the number of rotations of the motor 67 or a count of a time after the rear sensor 54 is turned OFF, and ends to read the image of the first face of the document Gn by means of the image reading unit 22 (S6).

The image reading unit 22 is a line image sensor setting a transverse direction of the document delivery path 32 to be a scanning line. Therefore, the image of the first face of the document Gn is read in such a manner that the scanning lines are arranged in parallel with a delivery direction. The control portion 60 causes the RAM 63 to store a number L1 of the scanning lines when the image of the first face of the document Gn is read (S7).

A leading and a trailing end of the document Gn subjected to a switchback delivery (S8) are inverted in the switchback path 39 and the document Gn is then returned to the document delivery path 32. When the leading end of the document Gn is detected by the rear sensor 54; the rear sensor 54 is turned ON (S9: Yes). The control portion 60 delivers the document Gn by a predetermined distance after the rear sensor 54 is turned ON (S10), and an image of a second face of the document Gn is started to be read by the image reading unit 22 (S11).

The rear sensor 54 is turned OFF when detecting the trailing end of the document Gn (S12: Yes), and the control portion 60 delivers the document Gn by a predetermined distance after the rear sensor 54 is turned OFF (S13) and the operation for reading the image of the second face of the document Gn by the image reading unit 22 is ended (S14). Thereafter, the control portion 60 causes the RAM 63 to store a number L2 of the lines read when the image of the second face of the document Gn is read (S15).

Figure 8:
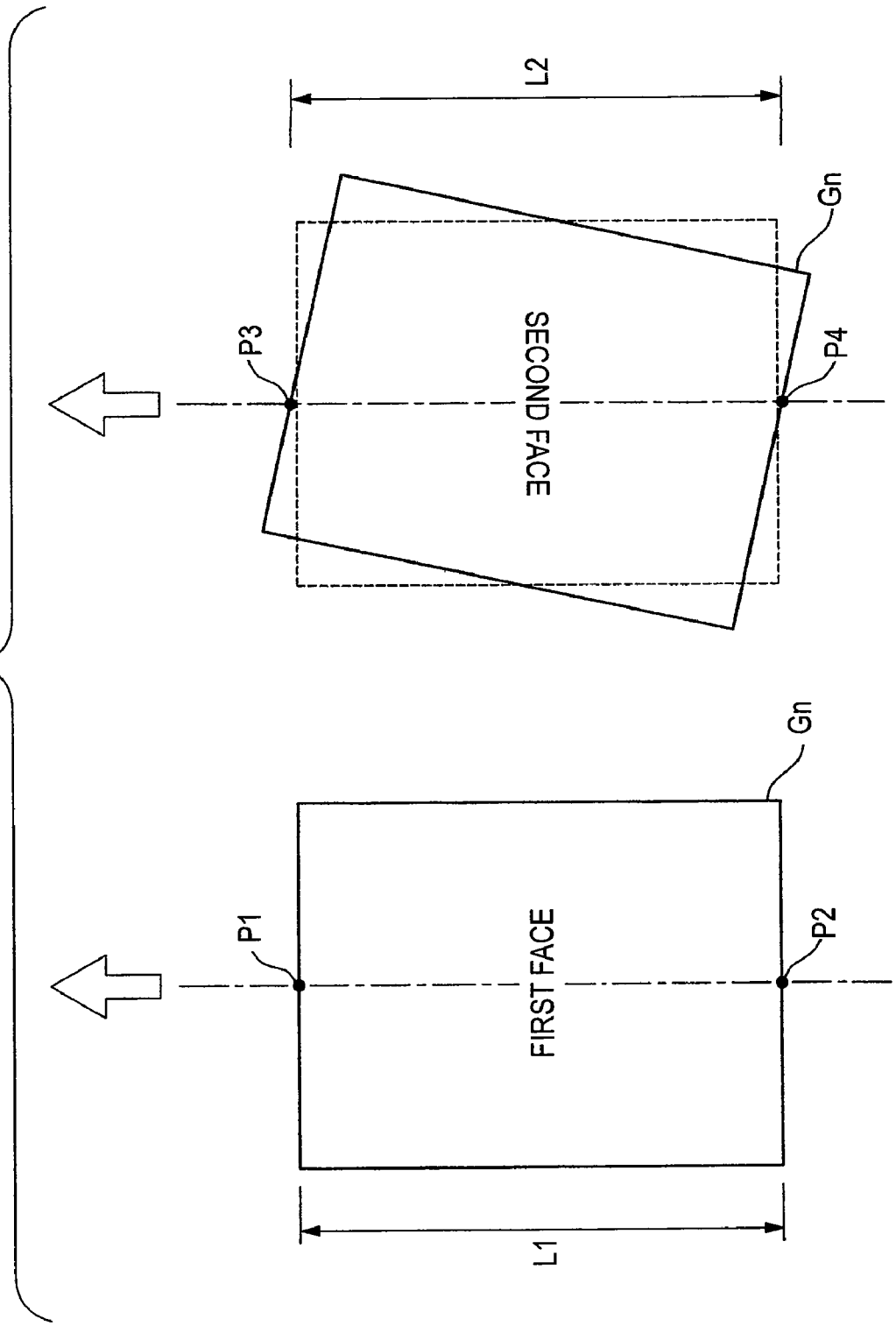
FIG. 8 is a schematic view showing a document having a skew.

Subsequently, the control portion 60 determines whether a difference between the numbers L1 and L2 of the read lines which are stored in the RAM 63 is equal to or greater than a predetermined threshold A (S16). It is assumed that the skew is not generated in the operation for reading the image of the first face of the document Gn and the skew is generated in the operation for reading the image of the second face as shown in FIG. 8. A direction of an arrow in the drawing indicates a delivery direction of the document Gn. As shown in a one-dotted chain line in the drawing, the rear sensor 54 detects the leading and the trailing ends in the document Gn on almost a center of the document delivery path 32. The document Gn is delivered through a so-called center register in such a manner that the almost center is aligned with that of the document delivery path 32. In the first face of the document Gn having no skew, detecting points P1 and P2 are detected as the leading and the trailing end in the document Gn by the rear sensor 54, respectively. The control portion 60 controls the start and end of the image reading operation of the image reading unit 22 based on the ON/OFF operations of the rear sensor 54 on the detecting points P1 and P2. An image is read from the first face of the document Gn in the number L1 of the read lines by means of the image reading unit 22.

In the second face of the document Gn having the skew, detecting points P3 and P4 are detected as the leading and the trailing end in the document Gn by the rear sensor 54, respectively. When the document Gn has the skew, the almost center of the document delivery path 32 in which the rear sensor 54 is disposed is not coincident with that of the document Gn. Consequently, the detecting points P3 and P4 of the document Gn which are detected by the rear sensor 54 are placed on an outside in the delivery direction from the leading and the trailing end in the document Gn having no skew shown in a dotted line in the drawing. The control portion 60 controls the start and end of the image reading operation of the image reading unit 22 based on the ON/OFF operations of the rear sensor 54 on the detecting points P3 and P4. An image is read from the second face of the document Gn in the number L2 of the read lines by means of the image reading unit 22.

If the skew is generated on the second face of the document Gn, thus, a distance between the detecting points P3 and P4 of the second face having the skew is greater than a distance between the detecting points P1 and P2 of the first face having no skew. Therefore, the number L2 of the read lines of the second face of the image reading unit 22 for reading the image based on the ON/OFF operations of the rear sensor 54 is greater than the number L1 of the read lines of the first face having no skew. If the skew is generated on either the first face or the second face of the document Gn, accordingly, a difference is made between the number L1 of the read lines of the first face and the number L2 of the read lines of the second face in the document Gn. The control portion 60 determines that the document Gn has the skew if the difference is equal to or greater than a predetermined threshold A (S17), and determines that the document Gn has no skew if the difference is smaller than the threshold A (S18).

While the control portion 60 determines the presence of the skew from the difference between the number L1 of the read lines of the first face and the number L2 of the read lines of the second face in the document Gn in the aspect, the skew detecting unit may determine that the skew is present when the number of the read lines of the document read by the image reading unit 22 is equal to or greater than a predetermined number of lines. Accordingly, a reference number Ls of read lines corresponding to a document size is prestored in the ROM 62 of the control portion 60, and a difference between the numbers L1 and L2 of the read lines obtained when the image is read from the first face or the second face of the document Gn and the reference number Ls of the read lines is obtained and it may be determined that the document Gn has the skew if the difference is equal to or greater than the predetermined threshold A. Consequently, it is possible to determine the presence of the skew of the first and second faces of the document Gn independently.

Figure 9:
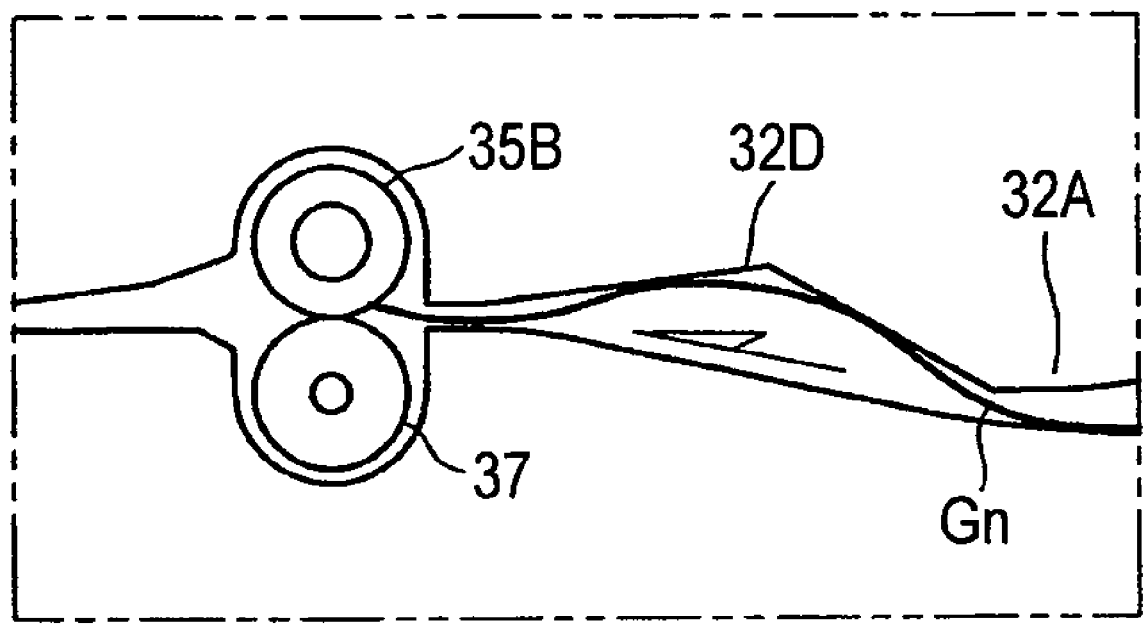
FIG. 9 is an enlarged view showing a structure of a register mechanism.

A register mechanism (skew correcting unit) for correcting the skew of the document delivered through the document delivery path 32 is implemented by the control portion 60, the motor 67, the delivery roller 35 and the switchback roller 43. As shown in FIG. 9, a space 32D for permitting a flexure of the document Gn is formed in the upper portion 32A of the document delivery path 32 and the delivery roller 35B functions as a register roller. More specifically, the document Gn delivered from the sheet feed tray 30 or the switchback path 39 passes through the crossing position 40 (a right side in FIG. 9) and reaches the space 32D of the upper portion 32A. The document Gn is delivered by means of the delivery roller 35A or the switchback roller 43. At this time, the control portion 60 blocks a transfer of the driving operation from the motor 67 to the delivery roller 35B. Accordingly, the delivery roller 35B is stopped.

The document Gn reaching the space 32D is further delivered and the leading end thereof hits against the delivery roller 35B as shown in the drawing. The delivery roller 35B is maintained to be stopped, while the delivery roller 35A or the switchback roller 43 is being rotated and driven. Therefore, the document Gn is deformed to be flexed corresponding to the space 32D in a state in which the leading end hits against the delivery roller 35B. Even if the document Gn has the skew, consequently, the leading end of the document Gn is aligned by the roller face of the delivery roller 35B.

If a proper flexure is generated on the document Gn, the control portion 60 carries out a driving transmission from the motor 67 to the delivery roller 35B, thereby rotating the delivery roller 35B. A timing for rotating the delivery roller 35B can be set as a time that the second front sensor 53 detects the leading end of the document Gn and is then delivered by a predetermined delivery distance by means of the delivery roller 35A in the document Gn fed from the sheet feed tray 30, for example, and can be set as a time that the switchback roller 43 is rotated reversely and is then delivered by a predetermined delivery distance in the document Gn subjected to the switchback delivery. By such a register mechanism, the skew of the document Gn delivered through the upper portion 32A of the document delivery path 32 is corrected.

Description will be given to the image reading operation to be carried out by the image reading apparatus 1.

The image reading apparatus 1 can be used as both the FBS and the ADF 3. Since the use for the FBS is not particularly related to the invention, detailed description will be omitted. In the case in which the ADF 3 is used, the document cover 4 is maintained to be closed with respect to the document mounting table 2. The opening and closing operations of the document cover 4 are detected by a sensor provided in the document mounting table 2. When the document cover 4 is closed, the ADF 3 is controlled to be usable. The document Gn to be read onto the sheet feed tray 30 is mounted. The document Gn is mounted on the sheet feed tray 30 in so-called face-up in such a manner that a face to be read (the first face) is placed on an upper side. Moreover, at least one document Gn is preferable. For example, in the case in which the images of the documents Gn having the same size are to be read, they are mounted on the sheet feed tray 30 in such a manner that a first face of a first document G1 is turned upward, that is, in a superposing and aligning state in face-up.

When a command for starting the reading operation is input to the image reading apparatus 1, the motor 67 is driven so that the pickup roller 33, the separating roller 34, the delivery rollers 35A, 35B, 35C and 35D, the sheet discharge roller 36, and the switchback roller 43 are rotated and driven in a predetermined timing. Moreover, the arm 29 is moved downward so that the pickup roller 33 comes in pressure contact with the document G1 on the sheet feed tray 30. Then, the documents are separated one by one from the document G1 in an uppermost position for directly receiving the rotating forces of the pickup roller 33 and the separating roller 34 and are fed into the document delivery path 32. The document Gn which is fed is guided to the document delivery path 32 and is delivered to the reading position, and the image of the document Gn is read by the image reading unit 22 standing by below the reading position. Thereafter, the document Gn from which the image is completely read is discharged to the sheet discharge tray 31. In such an image reading operation, the delivery path for the document Gn is varied in both the case in which the either side of the document Gn is read and the case in which the both sides of the document Gn are read. Whether the either side or both sides of the document Gn is/are read is determined depending on a single side reading mode or a double side reading mode which is preset before the start of the reading operation is input.

Figure 10:
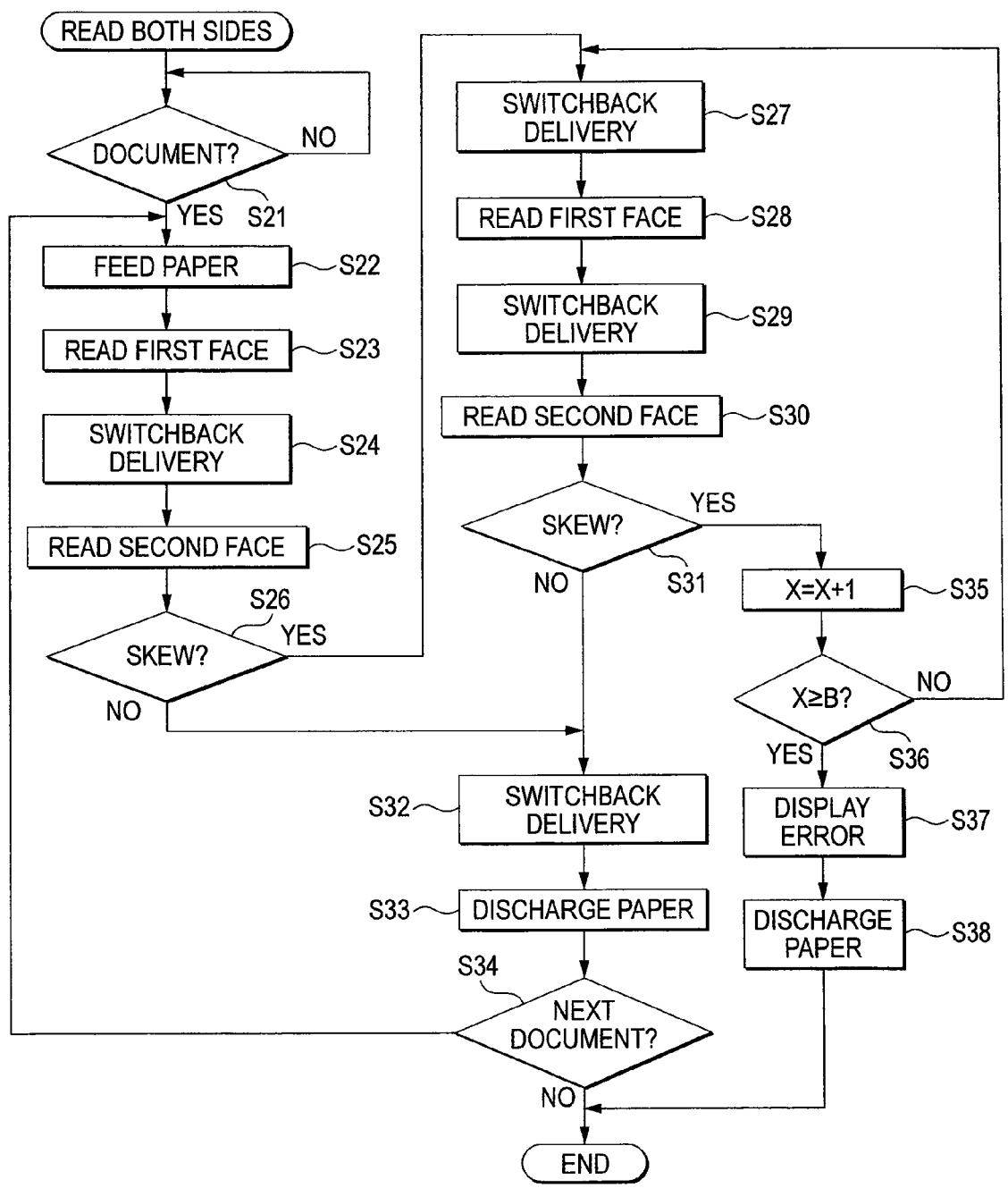
FIG. 10 is a flowchart showing an image reading operation in a double side reading mode.
Figure 11:
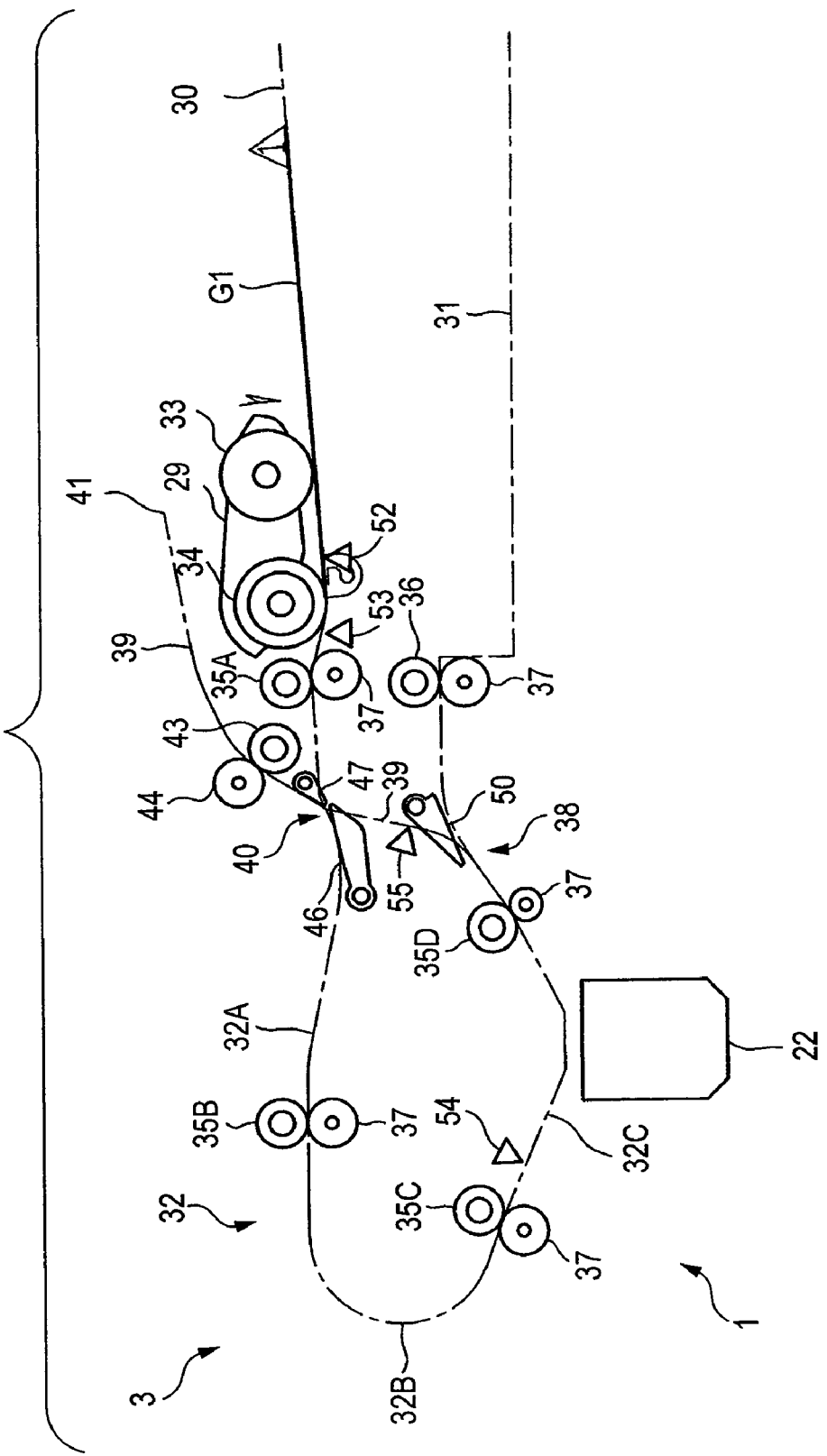
FIG. 11 is a schematic view showing the image reading operation in the double side reading mode.

The double side reading mode will be described below. FIG. 10 is a flowchart showing the operation of the image reading apparatus 1 in the double side reading mode. Before the document Gn is fed, the guide flap 50 is placed in a position in which the delivery path in the coupling position 38 is linked from the reading position side of the document delivery path 32 to the sheet discharge tray 31 side as shown in FIG. 11. The guide flap 46 takes the third guide posture, that is, is placed in a position in which the delivery path in the crossing position 40 is provided continuously from the sheet feed tray 30 side of the document delivery path 32 to the reading position side, and the guide flap 47 takes the fifth guide posture, that is, is placed in a position in which the delivery path in the crossing position 40 is provided continuously from the terminal 41 side of the switchback path 39 to the reading position side of the document delivery path 32. In the drawing, a face of the document Gn shown in "1" is a first face to be read earlier in the double side reading operation and a face shown in "2" is a second face to be read later. The first and second faces have a relationship of a surface and a back face.

When the command for starting the reading operation is input to the image reading apparatus 1, whether the document Gn is mounted on the sheet feed tray 30 is detected by the first front sensor 52 (S21). The control portion 60 carries out an error display of "No document" on the liquid display portion 12 of the operation panel 5 in the image reading apparatus 1 in the case in which it is determined that the document Gn is not mounted on the sheet feed tray 30. If the document Gn is mounted on the sheet feed tray 30, the motor 67 is driven at a predetermined speed, thereby feeding the document G1 (S22).

The control portion 60 drives the motor 67, and furthermore, moves the arm 29 downward. Consequently, the pickup roller 33 comes in pressure contact with the document G1 mounted on the sheet feed tray 30. The driving force of the motor 67 is transmitted so that the pickup roller 33 and the separating roller 34 are rotated in a feeding direction. Consequently, the document G1 is reeled into the document delivery path 32. In some cases in which a plurality of documents Gn is mounted on the sheet feeding tray 30, a document G2 provided directly thereunder is also fed together with the document G1 in the uppermost position. However, the document G2 is controlled by a separating pad provided in an opposed position to the separating roller 34.

In the document delivery path 32, the driving force of the motor 67 is transmitted to the delivery rollers 35A, 35B, 35C and 35D and the sheet discharge roller 36 in a predetermined timing so that each roller is rotated in order to deliver the document Gn from the upstream side to the downstream side of the document delivery path 32, that is, in the delivery direction. The document G1 fed from the sheet feed tray 30 to the document delivery path 32 is nipped between the delivery roller 35A and the pinch roller 37 so that the rotating force is transmitted. Consequently, the document G1 is delivered to the crossing position 40 through the document delivery path 32. The document G1 is fed to the document delivery path 32 so that the second front sensor 53 is turned ON.

Figure 12:
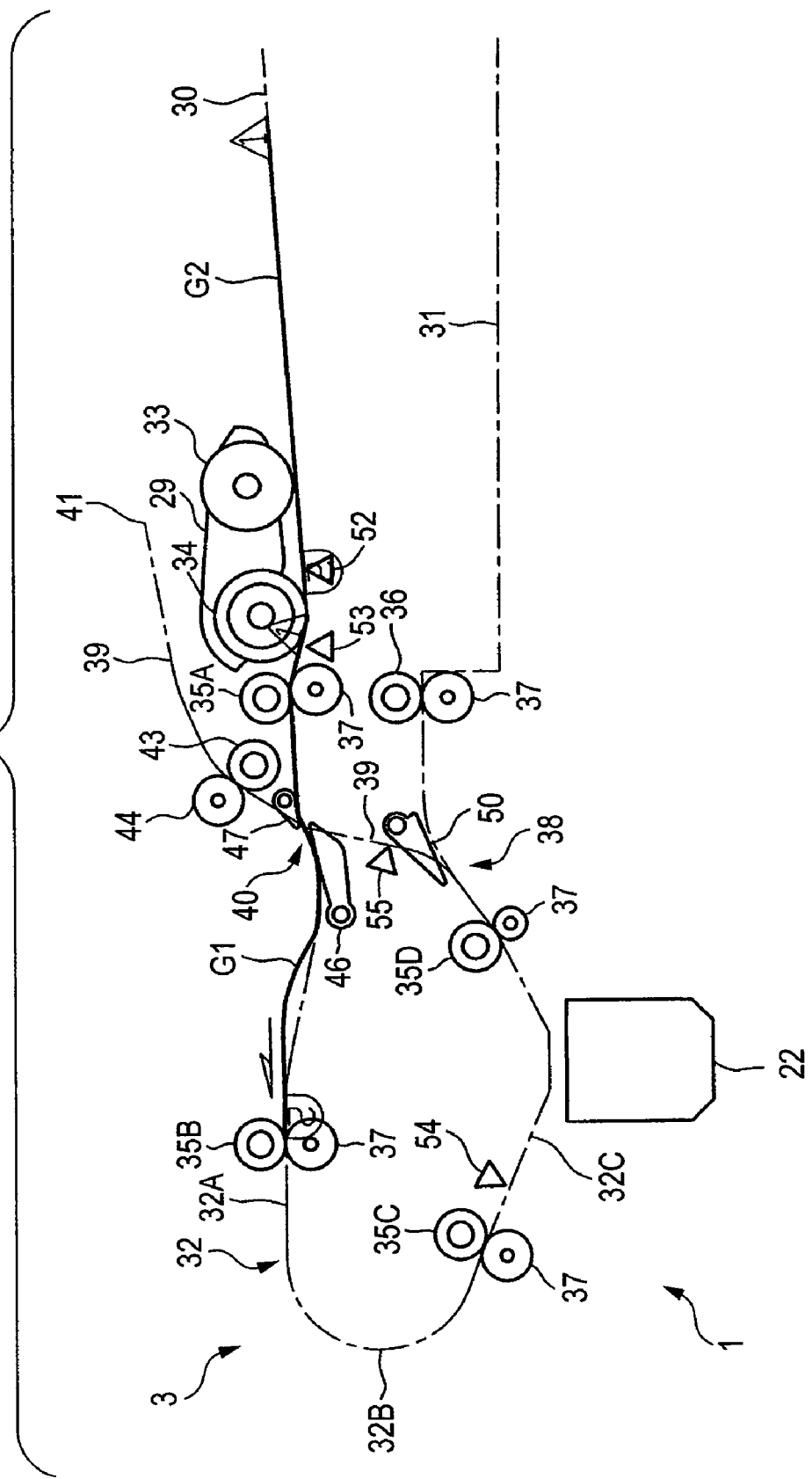
FIG. 12 is a schematic view showing the image reading operation in the double side reading mode.

The guide flap 47 closes the delivery path from the sheet feed tray 30 side of the document delivery path 32 to the crossing position 40. Therefore, the document G1 to be delivered to the crossing position 40 abuts on the guide flap 47. As shown in FIG. 12, the guide flap 47 changes the posture from the fifth guide posture to the sixth guide posture so as to be pushed against the document G1 delivered through the document delivery path 32. Consequently, the delivery path is provided continuously from the sheet feed tray 30 side of the document delivery path 32 to the reading position side, and furthermore, the delivery path to the terminal 41 side of the switchback path 39 is closed. Moreover, the delivery path to the coupling position 38 side of the switchback path 39 is closed by the guide flap 46. Accordingly, the document G1 reaching the crossing position 40 from the sheet feed tray 30 side of the document delivery path 32 is guided to the guide flap 46 and the guide flap 47 and does not advance in any direction of the switchback path 39 but is delivered to the reading position side of the document delivery path 32.

In the document G1 delivered from the crossing position 40 to the reading position side of the document delivery path 32, the leading end in the delivery direction hits against the delivery roller 35B. Since the control portion 60 blocks the transmission of the driving operation from the motor 67 to the delivery roller 35B, the delivery roller 35B is stopped. The document G1 delivered by the delivery roller 35A is deformed to be flexed in a state in which the leading end in the delivery direction hits against the delivery roller 35B. Consequently, the leading end in the delivery direction of the document G1 is aligned by the roller face of the delivery roller 35B so that the skew is corrected. Then, the control portion 60 transmits the driving operation from the motor 67 to the delivery roller 35B, thereby rotating the delivery roller 35B.

The circumferential speeds of the delivery rollers 35A, 35B, 35C and 35D and the sheet discharge roller 36 are set to be higher than the circumferential speed of the separating roller 34. Therefore, the separating roller 34 runs idle by the document G1 nipped and delivered by the delivery roller 35A and the pinch roller 37 in pressure contact with the separating roller 34. Consequently, a predetermined gap is formed in the delivery direction on the first document G1 and the second document G2. The control portion 60 blocks the transmission of the driving operation to the pickup roller 33 and the separating roller 34 after the second front sensor 53 detects the trailing end in the delivery direction of the document G1 and is thus turned OFF. Consequently, the document G2 is not fed from the sheet feed tray 30 to the document delivery path 32 but is held on the sheet feed tray 30.

Figure 13:
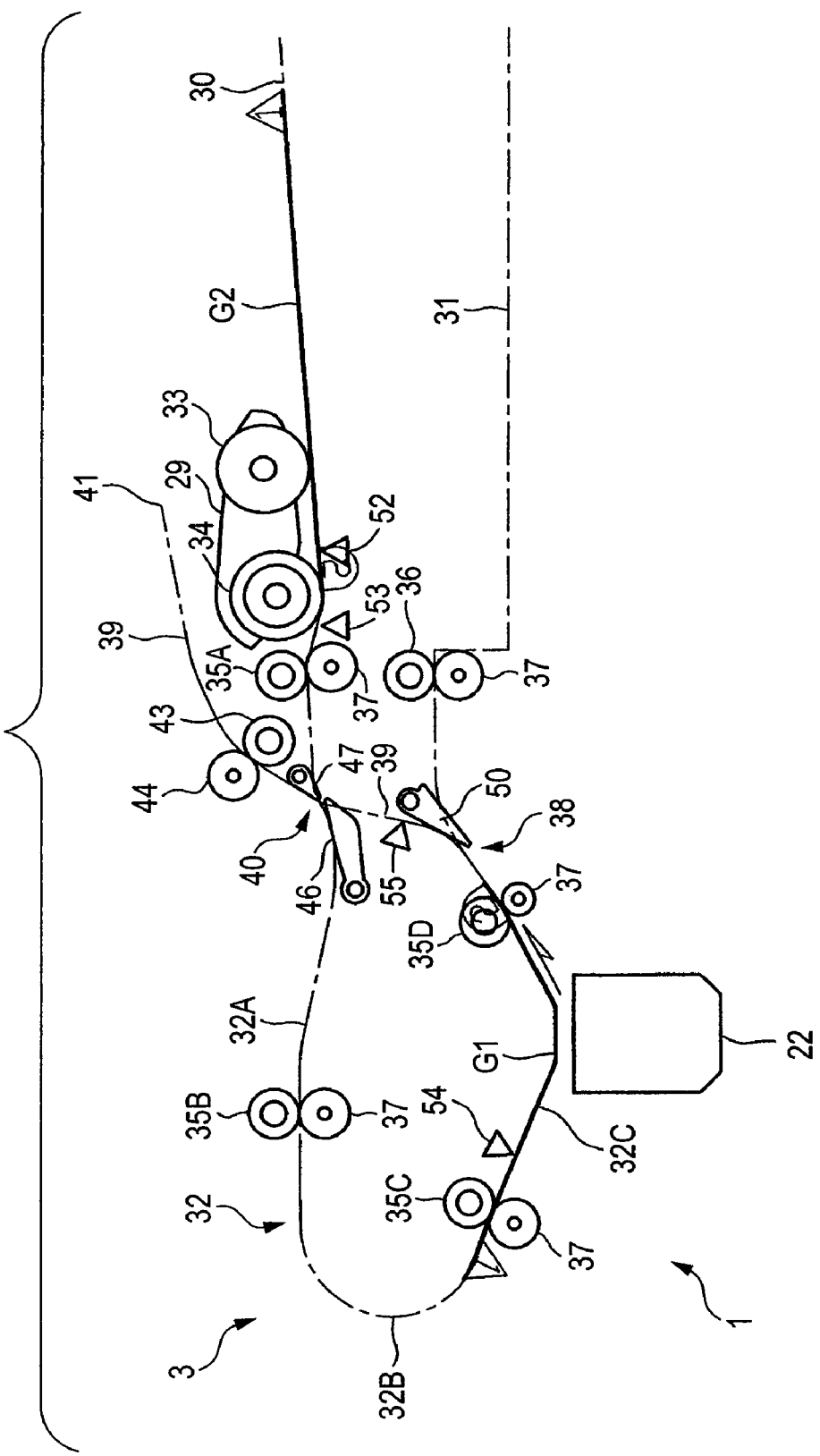
FIG. 13 is a schematic view showing the image reading operation in the double side reading mode.

As shown in FIG. 13, the document G1 is delivered to be inverted downward by the curved portion 32B of the document delivery path 32 and the rear sensor 54 detects the leading end in the delivery direction of the document G1 and is thus turned ON. The leading end in the delivery direction of the document G1 is detected by the rear sensor 54 and reaches the reading position after a predetermined time passes. If the leading end in the delivery direction of the document G1 reaches the reading position, therefore, the control portion 60 operates the image reading unit 22, thereby reading the image of the document G1. The document G1 passes through the reading position with the first face opposed to the image reading unit 22 so that an image of the first face of the document G1 is read by the image reading unit 22 (S23).

The rear sensor 54 is turned OFF when detecting the trailing end in the delivery direction of the document G1. The control portion 60 ends to read the image of the first face of the document G1 by the image reading unit 22 after a predetermined time passes since the rear sensor 54 is turned OFF. Image data of the first face read by the image reading unit 2 are stored in the RAM 63 of the control portion 60. Moreover, the number L1 of the read lines of the image data is also stored in the RAM 63.

Figure 14:
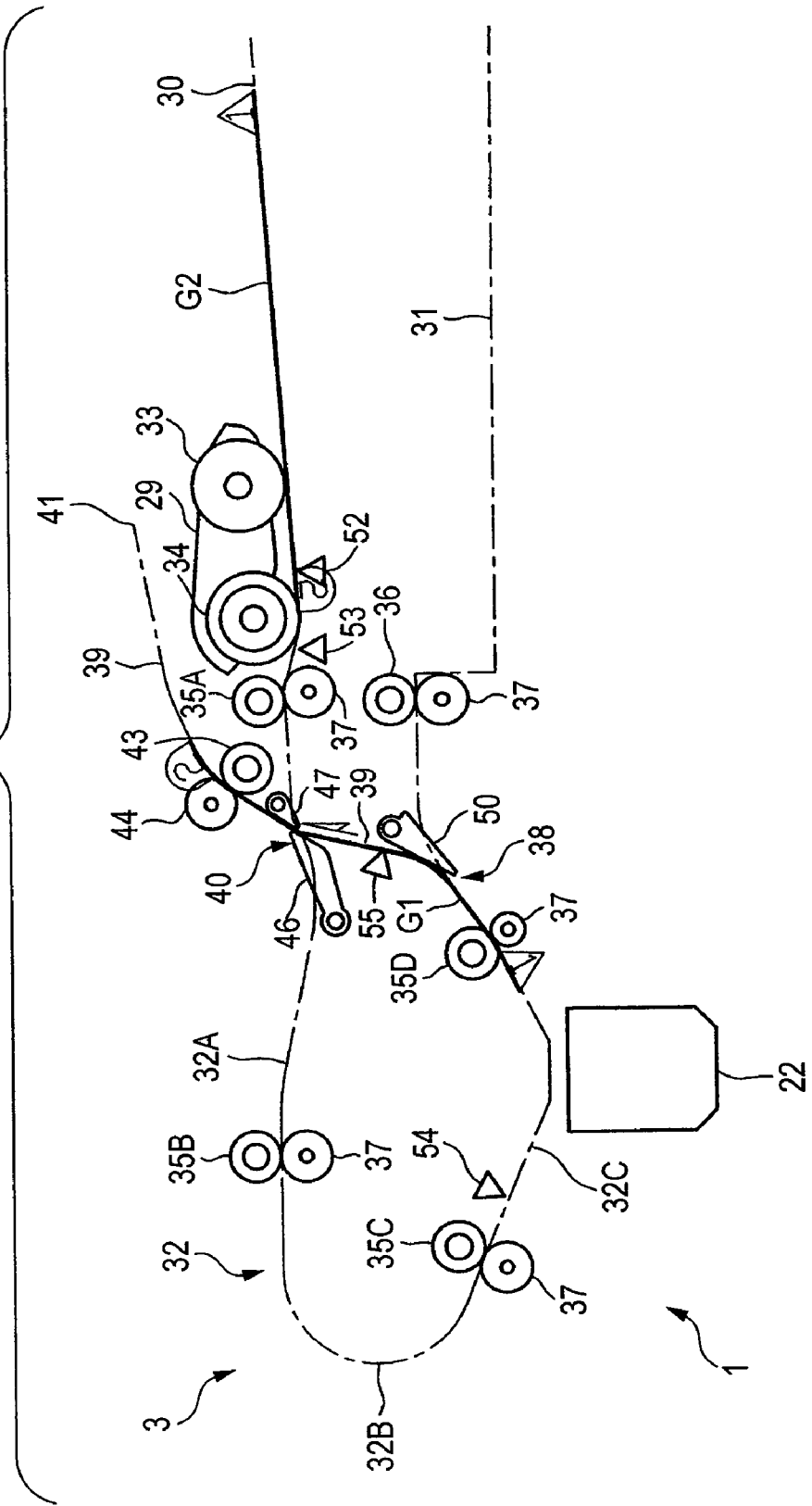
FIG. 14 is a schematic view showing the image reading operation in the double side reading mode.

The document G1 in which the image of the first face is completely read is guided to the switchback path 39 and is thus switchback delivered (S24). Specifically, description will be given. As shown in FIG. 14, the document G1 having the first face read is guided to the guide flap 50 and thus enters the switchback path 39 from the document delivery path 32 in the coupling position 38. The guide flap 50 is changed to take the second guide posture in an optional timing in which the document G1 reaches the coupling position 38. The switchback sensor 55 is turned ON when detecting the leading end in the delivery direction of the document G1 entering the switchback path 39.

The guide flap 46 closes the delivery path from the switchback path 39 to the crossing position 40. Therefore, the document G1 entering the switchback path 39 abuts on the guide flap 46 when reaching the crossing position 40. The guide flap 46 changes the posture from the third guide posture to the fourth guide posture so as to be pushed up by the document G1 delivered through the switchback path 39 as shown in FIG. 14. Consequently, the delivery path from the coupling position 38 side of the switchback path 39 to the terminal 41 side of the switchback path 39 is provided continuously, and furthermore, the delivery path to the reading position side of the document delivery path 32 is closed. Moreover, a delivery path to the sheet feed tray 30 side of the document delivery path 32 is closed by the guide flap 47. Accordingly, the document G1 reaching the crossing position 40 from the coupling position 38 side of the switchback path 39 is guided to the guide flap 46 and the guide flap 47 and is thus delivered to the terminal 41 side of the switchback path 39 without entering the document delivery path 32. Then, the document G1 is nipped by the switchback roller 43 and the pinch roller 44 and is delivered through the switchback path 39 toward the terminal 41 side by a rotation in a pull-in direction of the switchback roller 43.

Figure 15:
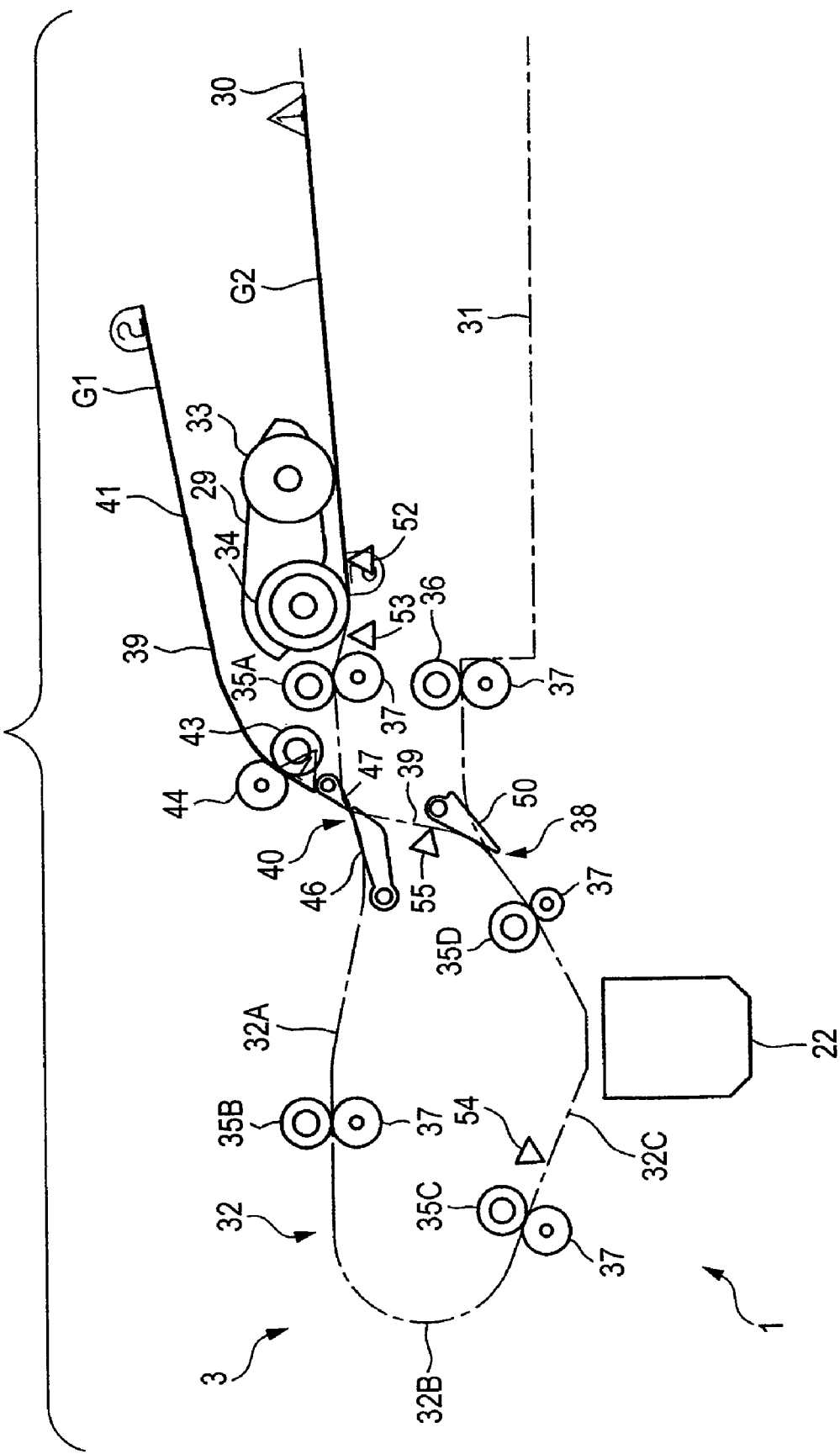
FIG. 15 is a schematic view showing the image reading operation in the double side reading mode.

As shown in FIG. 15, the trailing end in the delivery direction of the document G1 perfectly enters the terminal 41 side beyond the crossing position 40 of the switchback path 39 and the control portion 60 then switches a rotating direction of the motor 67. The switchback sensor 55 detects the trailing end in the delivery direction of the document G1 delivered through the switchback path 39 and is then turned OFF, and thereafter, the trailing end in the delivery direction of the document G1 is delivered through the crossing position 40 after a predetermined time passes. Accordingly, the control portion 60 determines that the trailing end in the delivery direction of the document G1 perfectly enters the terminal 41 side beyond the crossing position 40 of the switchback path 39 through a detection signal of the switchback sensor 55 and the count of a delivery distance or a delivery time by means of the delivery roller 35D and the switchback roller 43. The rotating direction of the motor 67 is switched so that the document G1 nipped between the switchback roller 43 and the pinch roller 44 and protruded from the terminal 41 is returned to the crossing position 40. More specifically, the document G1 is switchback delivered to be returned to the crossing position 40 through the switchback path 39.

When a part of the document G1 is protruded from the terminal 41 of the switchback path 39 to the outside of the ADF 3, a portion of the document G1 which is protruded is supported by the document support portion 42. When the document G1 passes through the crossing position 40 and goes away from the guide flap 46, moreover, the guide flap 46 is rotated downward and is thus recovered to take the third guide posture.

Figure 16:
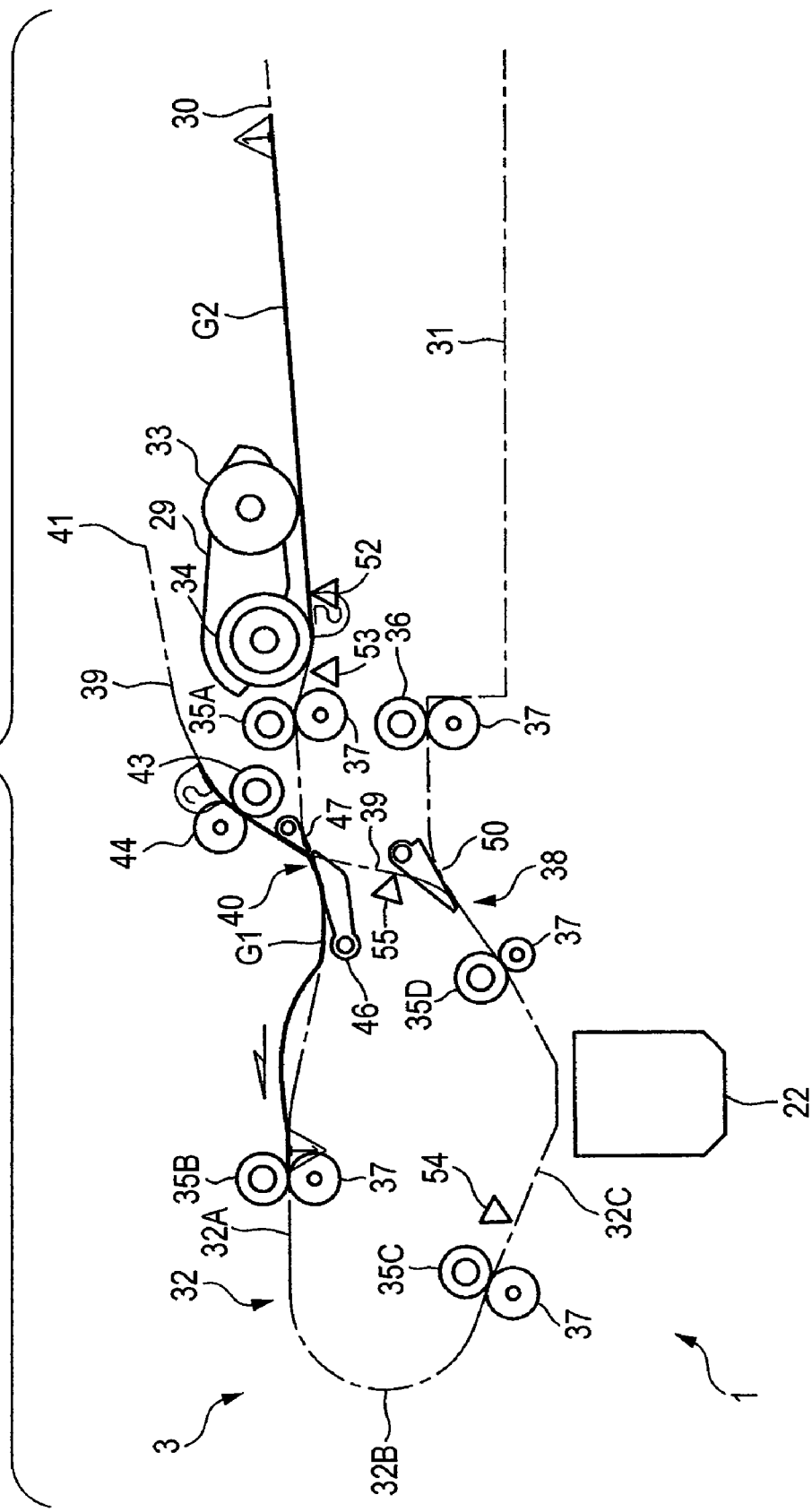
FIG. 16 is a schematic view showing the image reading operation in the double side reading mode.

As shown in FIG. 16, the document G1 returned from the switchback path 39 abuts on the guide flap 46 taking the third guide posture in the crossing position 40. The guide flap 46 is not rotated downward in the third guide posture. Accordingly, the delivery path from the terminal 41 side of the switchback path 39 to the reading position side of the document delivery path 32 is provided continuously, and furthermore, the delivery path to the coupling position 38 side of the switchback path 39 is closed. Moreover, the guide flap 47 closes the delivery path to the sheet feed tray 30 side of the document delivery path 32. Therefore, the document G1 is guided to the guide flap 46 and the guide flap 47 and does not enter the coupling position 38 side of the switchback path 39 and the sheet feed tray 30 side of the document delivery path 32 but is delivered from the terminal 41 side of the switchback path 39 to the reading position side of the document delivery path 32. The document G1 is returned from the switchback path 39 to the upstream side of the reading position of the document delivery path 32 so that the document G1 is first delivered through the document delivery path 32, and is then retransmitted through the document delivery path 32 in a state in which the leading and the trailing end are inverted. Thus, the document G1 is switchback delivered.

In the document G1 switchback delivered and returned to the document delivery path 32, the leading end in the delivery direction hits against the delivery roller 35B. The control portion 60 blocks the transmission of the driving operation from the motor 67 to the delivery roller 35B in a timing in which the switchback roller 43 is rotated reversely, for example. Consequently, the delivery roller 35B is stopped. The document G1 delivered by the switchback roller 43 is deformed to be flexed in a state in which the leading end in the delivery direction hits against the delivery roller 35B. Consequently, the leading end in the delivery direction of the document G1 is aligned by the roller face of the delivery roller 35B so that a skew is corrected. Then, the control portion 60 transmits the driving operation from the motor 67 to the delivery roller 35B, thereby rotating the delivery roller 35B. The document G1 is switchback delivered so that the leading and the trailing end are inverted. Therefore, the leading end in the delivery direction of the document G1 hitting against the delivery roller 35B when reading the image of the first face and the leading end in the delivery direction of the document G1 hitting against the delivery roller 35B when reading the image of the second face indicate ends in the delivery direction which are contrary to each other in the document G1.

Figure 17:
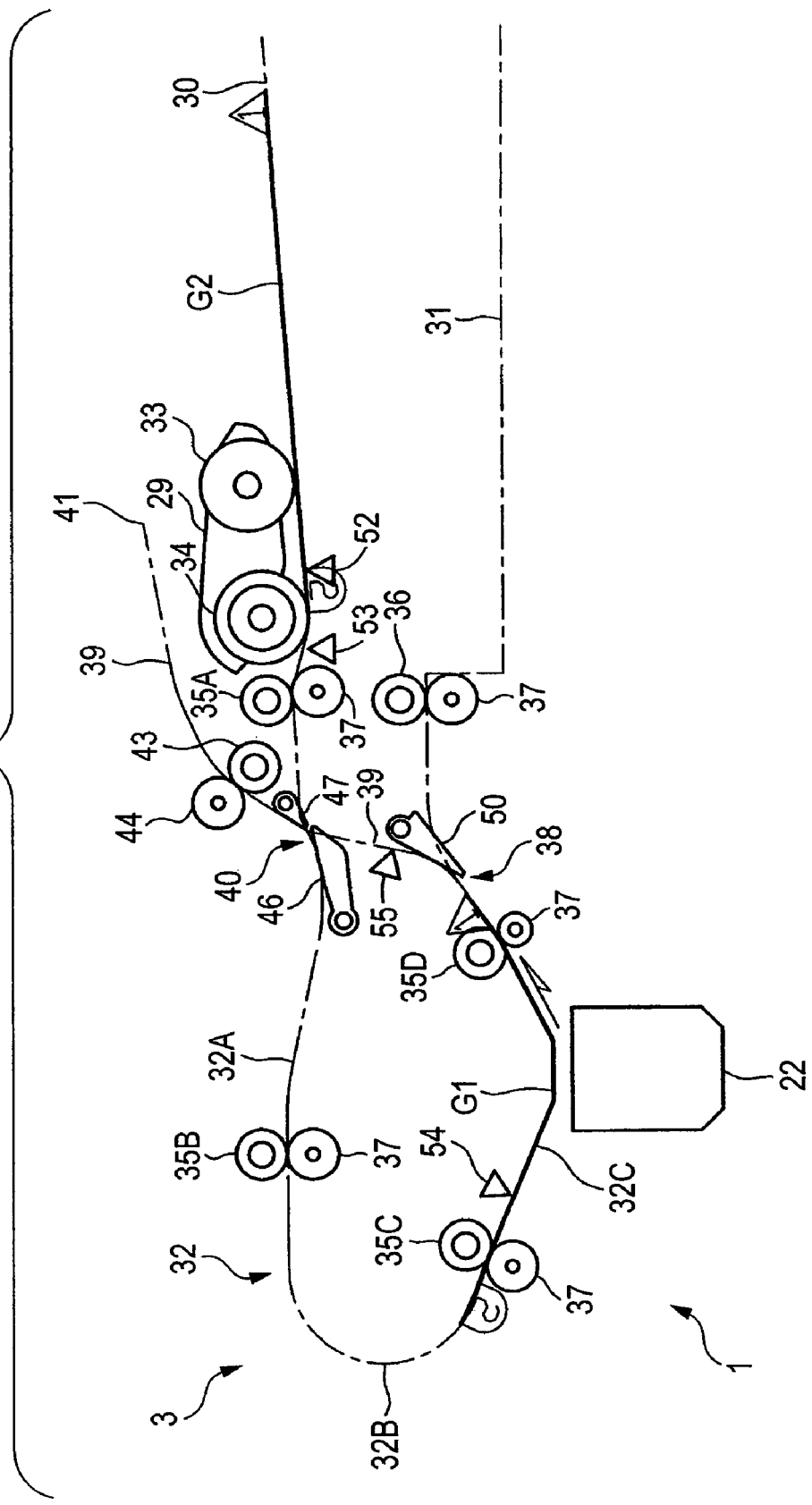
FIG. 17 is a schematic view showing the image reading operation in the double side reading mode.

When the leading end in the delivery direction of the document G1 is detected by the rear sensor 54 and the leading end in the delivery direction reaches the reading position, the control portion 60 causes the image reading unit 22 to read the image of the second face of the document G1 as shown in FIG. 17 (S25). The document G1 passes through the reading position with the second face opposed to the image reading unit 22 and the image of the second face of the document G1 is read by the image reading unit 22.

The rear sensor 54 is turned OFF when detecting the trailing end in the delivery direction of the document G1. The control portion 60 ends to read the image of the second face of the document G1 by the image reading unit 22 after a predetermined time passes since the rear sensor 54 is turned OFF. Image data of the second face read by the image reading unit 22 are stored in the RAM 63 of the control portion 60. Moreover, the number L2 of the read lines of the image data is also stored in the RAM 63.

The document G1 having the second face read is guided to the guide flap 50 in order to align directions of pages and then enters the switchback path 39 from the document delivery path 32 in the coupling position 38 again. The switchback sensor 55 is turned ON when detecting the leading end in the delivery direction of the document G1 entering the switchback path 39.

After the image of the second face of the document G1 is completely read, the control portion 60 determines whether the document G1 has a skew or not (S26). The control portion 60 determines whether the difference between the numbers L1 and L2 of the read lines which are stored in the RAM 63 is equal to or greater than the predetermined threshold A, thereby determining the presence of the skew as shown in FIG. 7. The control portion 60 determines that there is the skew if the difference between the numbers L1 and L2 of the read lines is equal to or greater than the predetermined threshold A and determines that the document has no skew if the difference is smaller than the threshold A. If the control portion 60 determines that the document G1 has no skew (S26: N), the switchback delivery for aligning the directions of the pages of the document G1 is carried out (S32).

The document G1 entering the switchback path 39 and reaching the crossing position 40 pushes the guide flap 46 upward and changes the posture from the third guide posture to the fourth guide posture, thereby entering the terminal 41 side of the switchback path 39 in the crossing position 40 in the same manner as in FIG. 14. In the same manner as in FIG. 15, then, the trailing end in the delivery direction of the document G1 completely enters the terminal 41 side beyond the crossing position 40 of the switchback path 39 and the control portion 60 then switches the rotating direction of the motor 67, and rotates the switchback roller 43 in a returning direction to return the document G1 to the crossing position 40. In the same manner as in FIG. 16, thereafter, the document G1 returned from the switchback path 39 is guided to the guide flap 46 and the guide flap 47 and is thus delivered from the terminal 41 side of the switchback path 39 to the reading position side of the document delivery path 32. Consequently, the document G1 is retransmitted through the document delivery path 32 in a state in which the leading and the trailing end are inverted again, that is, a state in which the document G1 is fed to the document delivery path 32 for the first time.

Then, the document G1 passes through the reading position with the first face opposed thereto. In that case, the rear sensor 54 is turned ON when detecting the document G1. The delivery serves to discharge a sheet to the sheet discharge tray 31 in a state in which the order of a plurality of documents Gn mounted on the sheet feed tray 30 is maintained. Therefore, the control portion 60 does not read the image of the document G1.

The document G1 reaching the coupling position 38 is guided to the sheet discharge tray 31 side in the coupling position 38 by means of the guide flap 50 and is discharged to the sheet discharge tray 30 with the first face placed in a lower part by means of the sheet discharge roller 36. The guide flap 50 is changed to take a first guide posture in an optional timing before the document G1 reaches the coupling position 38. Consequently, the document G1 is discharged to the sheet discharge tray 31 with the first face placed in the lower part (S33).

When the both sides of the document G1 are ended to be read, the control portion 60 determines whether the document G2 to be read next is set into the sheet feed tray 30 or not (S34). In the case in which a next document G2 is set into the sheet feed tray 30, the first front sensor 52 is turned ON. If it is determined that the document G2 is present, the control portion 60 transmits the driving operation from the motor 67 to the sheet feed roller 33 and the separating roller 34 to be rotated. Consequently, the document G2 mounted on the sheet feed tray 30 is fed to the document delivery path 32 so that the same double side reading operation as in the document G1 is carried out.

If it is determined that the skew of the document G1 is present (S26: Y), the control portion 60 reads the image of the document G1 after the switchback delivery which is being carried out (S27). More specifically, the document G1 entering the switchback path 39 and reaching the crossing position 40 pushes the guide flap 46 up to change the posture from the third guide posture to the fourth guide posture, thereby entering the terminal 41 side of the switchback path 39 in the crossing position 40 in the same manner as in FIG. 14 and the trailing end in the delivery direction of the document G1 perfectly enters the terminal 41 side beyond the crossing position 40 of the switchback path 39 and the control portion 60 then switches the rotating direction of the motor 67, thereby rotating the switchback roller 43 in a returning direction to return the document G1 to the crossing position 40 in the same manner as in the FIG. 15. In the same manner as in FIG. 16, thereafter, the document G1 returned from the switchback path 39 is guided to the guide flap 46 and the guide flap 47 so that it is delivered from the terminal 41 side of the switchback path 39 to the reading position side of the document delivery path 32. Consequently, the document G1 is returned to the document delivery path 32 in a state in which the leading and the trailing end are inverted again, that is, a state in which the first face is opposed to the reading position.

The document G1 switchback delivered and returned to the document delivery path 32 is deformed to be flexed in a state in which the leading end in the delivery direction hits against the delivery roller 35B in the same manner as described above. Consequently, the leading end in the delivery direction of the document G1 is aligned by the roller face of the delivery roller 35B so that the skew is corrected.

The leading end in the delivery direction of the document G1 is detected by the rear sensor 54. If the leading end in the delivery direction reaches the reading position, the control portion 60 causes the image reading unit 22 to read the image of the first face of the document G1 as shown in FIG. 13 (S28). The document G1 passes through the reading position with the first face opposed to the image reading unit 22, and the image of the first face of the document G1 is read by the image reading unit 22.

The rear sensor 54 is turned OFF when detecting the trailing end in the delivery direction of the document G1. The control portion 60 ends to read the image of the first face of the document G1 by the image reading unit 22 after a predetermined time passes since the rear sensor 54 is turned OFF. The image data of the first face read by the image reading unit 22 are stored in the RAM 63 of the control portion 60. Moreover, the number L1 of the read lines of the image data is also stored in the RAM 63. The image data and the number L1 of the read lines are updated for the image data of the previous first face and the number L1 of the read lines.

The document G1 which is ended to read the image of the first face is guided to the switchback path 39 and is switchback delivered as shown in FIGS. 14 to 16 (S29). The document G1 switchback delivered and returned to the document delivery path 32 is deformed to be flexed in a state in which the leading end in the delivery direction hits against the delivery roller 35B in the same manner as described above. Consequently, the leading end in the delivery direction of the document G1 is aligned by the roller face of the delivery roller 35B so that the skew is corrected.

The leading end in the delivery direction of the document G1 is detected by the rear sensor 54. If the leading end in the delivery direction reaches the reading position, the control portion 60 causes the image reading unit 22 to read the image of the second face of the document G1 as shown in FIG. 17 (S30) The document G1 passes through the reading position with the second face opposed to the image reading unit 22, and the image of the second face of the document G1 is read by the image reading unit 22.

The rear sensor 54 is turned OFF when detecting the trailing end in the delivery direction of the document G1. The control portion 60 ends to read the image of the second face of the document G1 by the image reading unit 22 after a predetermined time passes since the rear sensor 54 is turned OFF. The image data of the second face read by the image reading unit 22 are stored in the RAM 63 of the control portion 60. Moreover, the number L2 of the read lines of the image data is also stored in the RAM 63. The image data and the number L2 of the read lines are updated for the image data of the previous second face and the number L2 of the read lines.

The document G1 having the second face read is guided to the guide flap 50 in order to align directions of pages and then enters the switchback path 39 from the document delivery path 32 in the coupling position 38 again. The switchback sensor 55 is turned ON when detecting the leading end in the delivery direction of the document G1 entering the switchback path 39.

After the image of the second face of the document G1 is completely read, the control portion 60 determines whether the document G1 has a skew or not again (S31). The presence of the skew is determined in the same manner as described above. The control portion 60 determines whether the difference between the numbers L1 and L2 of the read lines which are updated and stored in the RAM 63 is equal to or greater than the predetermined threshold A, thereby determining the presence of the skew.

If the control portion 60 determines that the document G1 has no skew (S31: N), the switchback delivery for aligning the directions of the pages of the document G1 is carried out (S32) and the document G1 returned to the document delivery path 32 is guided to the sheet discharge tray 31 side in the coupling position 38 by means of the guide flap 50 and is discharged to the sheet discharge tray 31 with the first face placed in a lower part by means of the sheet discharge roller 36 (S33) in the same manner as described above.

In the case in which the control portion 60 determines that the document G1 has the skew (S31: Y), it counts up a number X of image reading times for the document G1 (S35). The number X of the image reading times represents the number of the double side reading times for the document G1 and has an initial value of "1". The number X of the image reading times is counted up by 1 to be "2". Based on the number X of the image reading times, the control portion 60 can recognize that the double side reading operation has been carried out twice. The number X of the image reading times thus counted up is stored in the RAM 63.

Next, the control portion 60 determines whether the number X of the image reading times thus counted up is equal to or greater than a predetermined threshold B. The threshold B is an upper limit of the number of times of repetition for the double side reading operation in the case in which the skew of the document G1 is not improved. If the number X of the image reading times is smaller than the threshold B (S25: N), the control portion 60 repeats an operation for switchback delivering the document G1 (S27), reading the image of the first face (S28), carrying out the switchback delivery (S29), reading the image of the second face (S30) and determining the presence of the skew (S31) until the control portion 60 determines that the document G1 has no skew. If it is determined that the skew is not present (S31: N), the switchback delivery for aligning the directions of the pages of the document G1 is carried out (S32) and the document G1 is discharged to the sheet discharge tray 31 with the first face placed in a lower part (S33) in the same manner as described above.

If the control portion 60 determines that the number X of the image reading times is equal to or greater than the threshold B (S36: Y), it carries out an error display on the liquid crystal display portion 12 of the operation panel 5. For example, the contents of the display include a display of the purport that the skew is not improved and a simple display of a reading error and an error identification number. In the case in which the skew of the document G1 is not improved even if the double side reading operation of the document G1 is repeated at a predetermined number of times, consequently, a user can be caused to recognize that the delivery of the ADF 3 has an abnormality. After the error display is carried out, the control portion 60 discharges the document G1 in the document delivery path 32 to the sheet discharge tray 31 (S38). An error notice is not limited to a visual display carried out by the liquid crystal display portion 12. For example, in the case in which the operation panel 5 is provided with a speaker, an error sound may be generated to cause the user to perform a visual recognition. In the case in which the image reading apparatus 1 is connected to a communication line such as a telephone line, moreover, it is also possible to inform a maintenance dealer of the generation of the error due to a facsimile communication through the communication line.

Thus, it is assumed that the document Gn is returned from the switchback path 39 to the document delivery path 32 to carry out the double side reading operation again in the case in which the control portion 60 detects the skew of the document Gn in the double side reading operation to be performed by returning the document Gn from the switchback path 39 to the document delivery path 32. Therefore, the image data tilted by the skew can be prevented from being used for double-sided copy and being stored in a recording medium. In the document Gn retransmitted from the switchback path 39 to the document delivery path 32, moreover, the skew is corrected by the register mechanism before the document Gn passes through the reading position again. By repeating the switchback delivery, therefore, it is possible to read the image from both sides of the document Gn having no skew.

In the aspect, the double side reading operation of the image reading apparatus 1 has been described on the assumption that the documents Gn mounted on the sheet feed tray 30 are discharged to the sheet discharge tray 31 in a state in which the order of the documents Gn is maintained. In the case in which it is not necessary to match the order of the documents Gn mounted on the sheet feed tray 30 with that of the documents Gn discharged to the sheet discharge tray 31 and the presence of the skew of the document Gn can be determined before the leading end in the delivery direction of the document Gn reaches the coupling position 38, it is also possible to deliver the document Gn in the coupling position 38 to the sheet discharge tray 31 side and to discharge the document G to the sheet discharge tray 31 without causing the document Gn to enter the switchback path 39 after delivering the document Gn with the second face opposed to the reading position. Consequently, the order of the documents Gn is not maintained in the sheet discharge tray 31. However, it is possible to omit a last switchback delivery. Therefore, it is possible to shorten a time required for reading both sides of the document Gn. By repeating the discharge of the document G1 and the feed of the document G2, moreover, it is also possible to shorten a time required for the delivery in the case in which both sides of each of the documents Gn are read continuously.

In the case in which the single side reading mode is set, moreover, the motor 67 is rotated by the control portion 60 so that the document Gn is reeled from the sheet feed tray 30 into the document delivery path 32. The image of the first face is read when the document Gn reaches the reading position. When the document Gn passes through the reading position, the document Gn is discharged to the sheet discharge tray 31. Also in such a single side reading mode, the presence of the skew of the document Gn is determined. In the case in which it is determined that the skew is present, the switchback delivery may be repeated to read the image of the document Gn having no skew. For example, it is possible to determine the presence of the skew of the document Gn by comparing the number L1 of the read lines of the first face of the document Gn with the standard number Ls of the read lines to determine whether the difference is equal to or greater than the threshold A.

A modification of the aspect will be described below. While the control portion 60 determines the presence of the skew of the document Gn based on the numbers L1 and L2 of the read lines of the image reading unit 22 and the threshold A in the aspect, the rear sensor 54 (document sensor) can also be used as the skew detecting unit.

Specifically, a pair of rear sensor 54 is disposed apart from each other in a transverse direction of the document delivery path 32. A distance between the rear sensors 54 is set to be smaller than a width of a document having the smallest size which can be delivered by the ADF 3. In the document Gn delivered by the ADF 3, consequently, two portions in left and right parts are detected by the rear sensors 54 on the upstream side of the reading position. In the case in which a detection timing of the document Gn obtained by the left and right rear sensors 54 is equal to or greater than a predetermined time difference, it is possible to determine that the skew is present.

Figure 18:
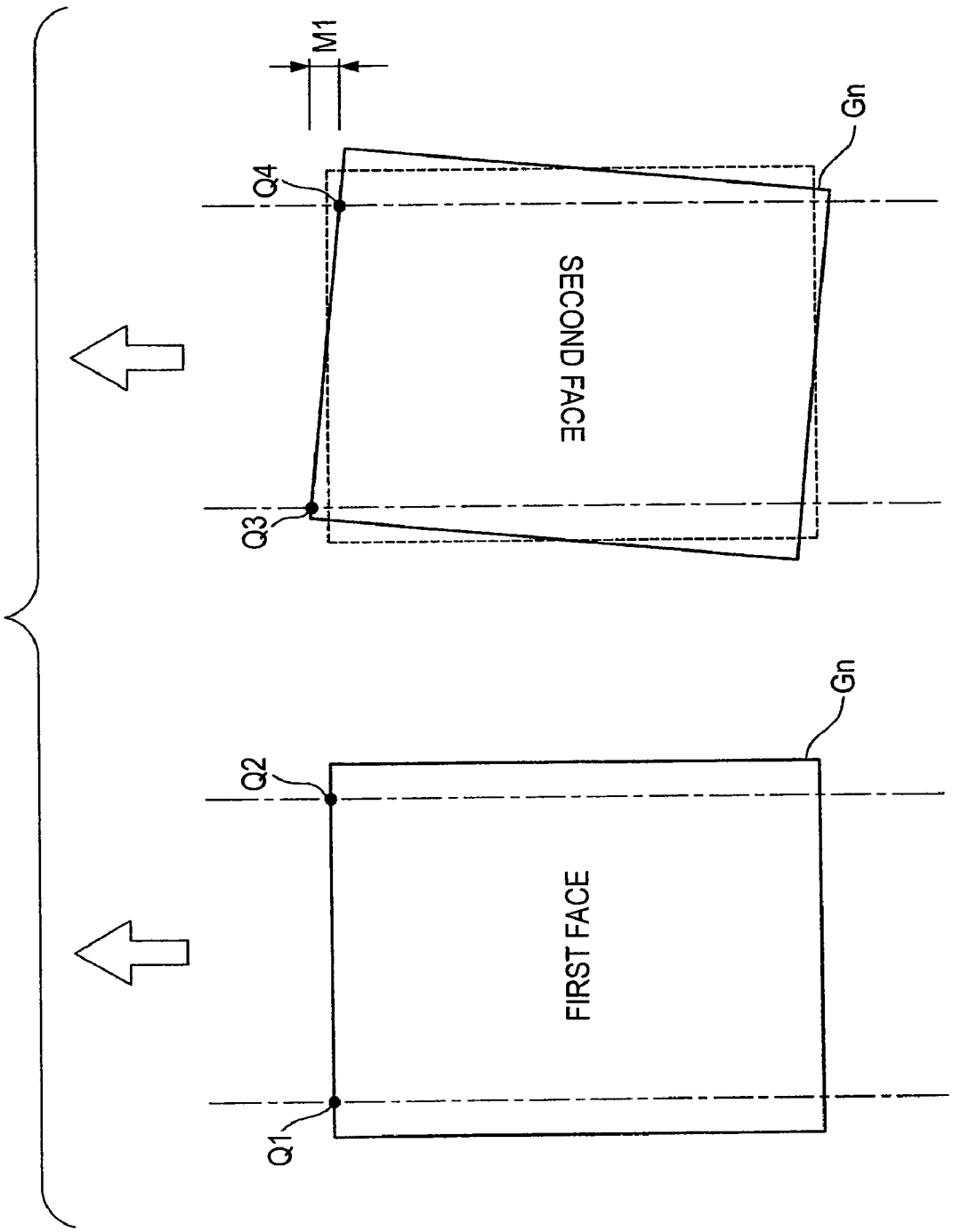
FIG. 18 is a schematic view showing detecting positions of a pair of rear sensors according to a modification.
Figure 19:
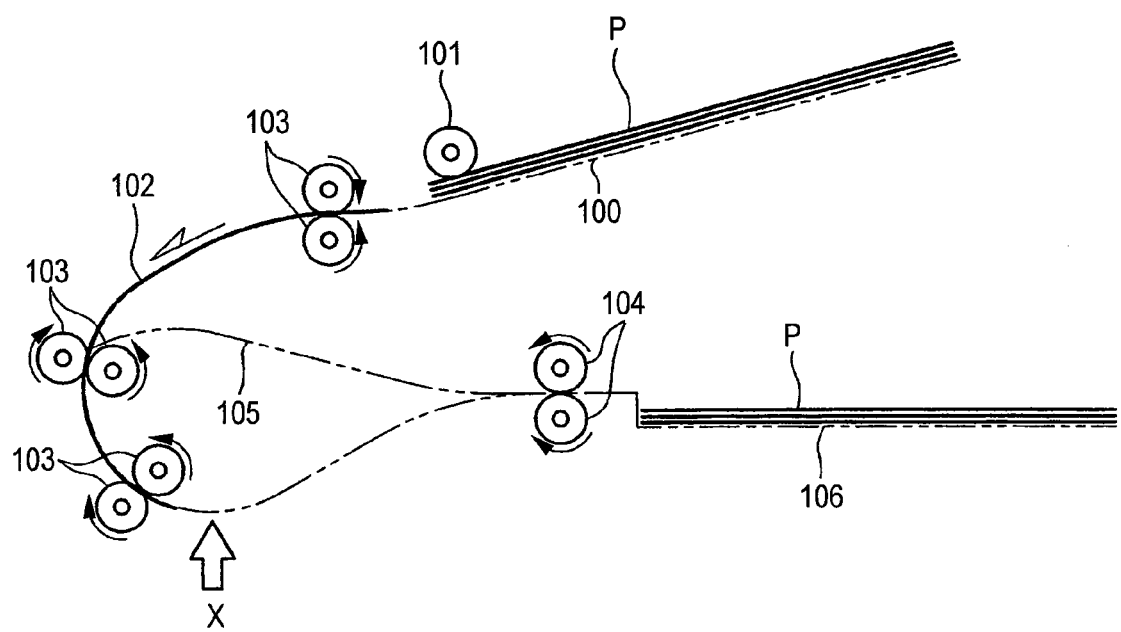
FIG. 19 is a schematic view showing a document delivery for a double side reading operation in a conventional automatic document delivering apparatus.
Figure 20:
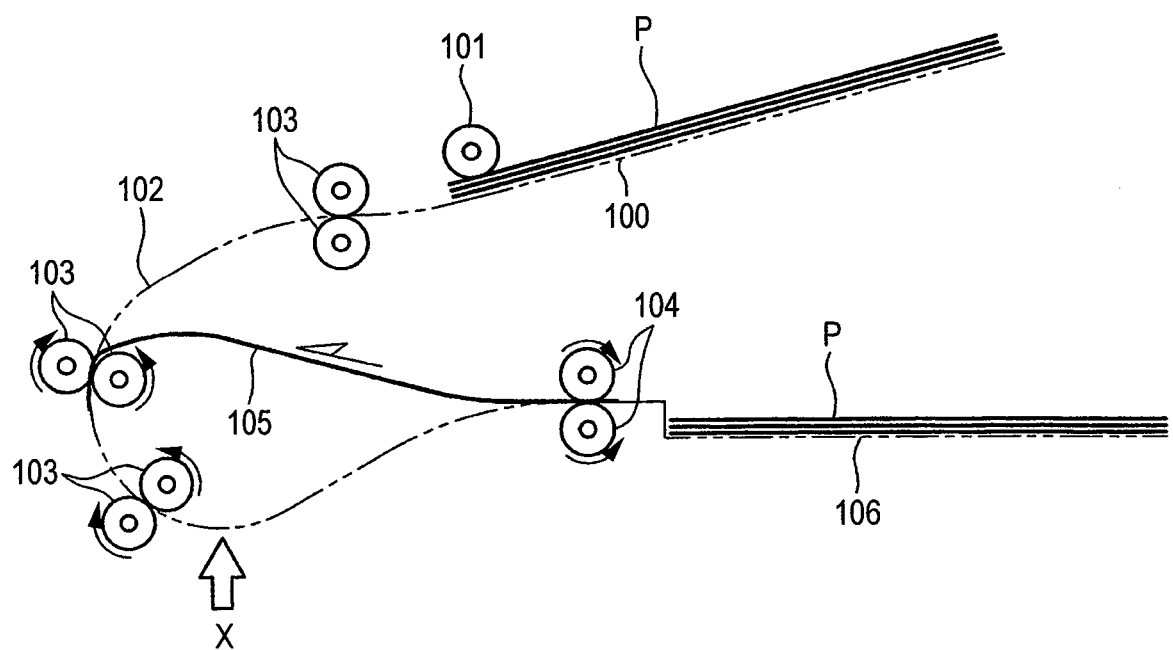
FIG. 20 is a schematic view showing the document delivery for the double side reading operation in the conventional automatic document delivering apparatus.

It is assumed that the skew is not present when the image of the first face of the document is to be read and is present when the image of the second face is to be read as shown in FIG. 18. A direction of an arrow in the drawing indicates a delivery direction of the document Gn and the rear sensors 54 detect the presence of the document Gn in a position shown in a one-dotted chain line in the drawing. Moreover, the document Gn is delivered by a so-called center register in such a manner that an almost center thereof is aligned with that of the document delivery path 32. In the first face of the document Gn having no skew, detecting points Q1 and Q2 of the rear sensors 54 are not shifted in the transverse direction of the document Gn. Accordingly, the rear sensors 54 detect the leading end in the delivery direction of the document Gn almost simultaneously.

In the second face of the document Gn having the skew, a shift M1 is generated in the delivery direction for detecting points Q3 and Q4. Accordingly, a timing for the rear sensors 54 to detect the leading end in the delivery direction of the document Gn is shifted. In the skew shown in the drawing, the left rear sensor 54 for detecting the detecting point Q3 detects the leading end in the delivery direction of the document Gn earlier than the right rear sensor 54 for detecting the detecting point Q4. If the document Gn has the skew, thus, a time difference is generated in the timing for the rear sensors 54 to detect the document Gn due to the shift M1. Therefore, the control portion 60 can determine that the document Gn has the skew if the difference is equal to or greater than a predetermined threshold, and can determine that the document Gn has no skew if the difference is smaller than the threshold.

The document sensor is not limited to the rear sensor 54 but a document sensor disposed between the crossing position 40 to which the document Gn is returned through the switchback path 39 and the reading position of the image reading unit 22 can implement the skew detecting unit.

While the register mechanism for correcting the skew of the document Gn is implemented by causing the leading end in the delivery direction of the document Gn to hit against the roller face, thereby flexing the document Gn in a state in which the delivery roller 35B is stopped in the aspect, moreover, the correction of the skew can also be implemented by a register mechanism for flexing the document Gn based on a difference in a circumferential speed between a pair of deliver rollers disposed apart from each other in the delivery direction of the document delivery path 32 or the switchback path 39.

Specifically, the circumferential speeds of the delivery roller 35A and the switchback roller 43 are set to be higher than the circumferential speed of the delivery roller 35B. Thus, the circumferential speeds are set by regulating a gear ratio of driving transmitting mechanisms from the motor 67 to the delivery rollers 35A and 35B and the switchback roller 43, for example. As shown in FIG. 9, moreover, the space 32D for permitting the flexure of the document Gn is formed in the upper portion 32A of the document delivery path 32.

The document Gn delivered from the sheet feed tray 30 or the switchback path 39 passes through the crossing position 40 and then reaches the space 32D of the upper portion 32A. At this time, the document Gn is delivered at a delivery speed corresponding to the circumferential speed of the delivery roller 35A or the switchback roller 43. The document Gn reaching the space 32D is further delivered so that the leading end in the delivery direction is nipped between the delivery roller 35B and the pinch roller 37. Consequently, the leading end side in the delivery direction of the document Gn is delivered at a delivery speed corresponding to the circumferential speed of the delivery roller 35B. The trailing end side in the delivery direction of the document Gn is delivered at a delivery speed corresponding to the circumferential speed of the delivery roller 35A or the switchback roller 43.

As described above, the circumferential speeds of the delivery roller 35A and the switchback roller 43 are higher than the circumferential speed of the delivery roller 35B. Therefore, the document Gn is delivered in such a manner that the trailing end side in the delivery direction is pushed out more quickly than the leading end side in the delivery direction, and is thus deformed to be flexed corresponding to the space 32D between the delivery roller 35B and the delivery roller 35A and switchback roller 43. Consequently, the skew of the document Gn is corrected. When the trailing end in the delivery direction of the document Gn passes through the delivery roller 35A and the switchback roller 43, then, the document Gn is delivered at the circumferential speed of the delivery roller 35B so that the flexure is eliminated. By such a register mechanism, similarly, it is possible to correct the skew of the document Gn delivered through the upper portion 32A of the document delivery path 32.

In addition to the register mechanism according to the aspect or the modification, moreover, a subsequent delivery speed may be changed to be lower than a normal delivery speed if the control portion 60 determines that the skew is present. When the delivery speed is reduced, a slip is generated with difficulty between the delivery roller 35 or the switchback roller 43 and the document Gn. Consequently, it can be expected that the skew is improved.

While the document Gn is returned from the switchback path 39 to the document delivery path 32 to read an image again when the control portion 60 detects the skew of the document Gn in the aspect and the modification, moreover, it is also possible to use an image processing to be carried out by the control portion 60 and the delivery to the switchback path 39 based on the detection of the skew when the control portion 60 can perform the image processing for correcting an inclination of image data.

For the image processing to be carried out by the control portion 60, it is possible to use a well-known method. For example, the control portion 60 calculates an inclination θ of the image data of the document Gn read by the image reading unit 22 based on a comparison of the number of read lines of the image data with the standard number of the read lines, a difference in a detection timing of the document Gn by the left and right rear sensors 54 or the detection of an edge of the image data. A rotation processing at the angle θ with respect to the image data thus read is carried out by an image processing method such as an affine transformation or a shift processing.

In order to correct the inclination θ of the image data by such an image processing, it is necessary to include all images recorded on the document Gn in the image data which are read. In other words, in the case in which the inclination θ is great and a part of the image recorded on the document Gn is provided out of a reading region of the image reading unit 22, a part of the images which are not read cannot be restored even if the inclination θ is corrected.

In the case in which the control portion 60 detects the skew of the document Gn, accordingly, the inclination θ of the image data of the document Gn is obtained and the control portion 60 determines whether the inclination θ exceeds a range in which the correction can be carried out by the image processing or not. If the inclination θ is included in the range in which the correction can be carried out, the document Gn is not delivered to the switchback path 39 to read the image again but the inclination θ is corrected by the image processing. If the inclination θ exceeds the range in which the correction can be carried out, the document Gn may be delivered to the switchback path 39 to read the image again as described above. In the case in which the correction can be carried out by the image processing of the control portion 60 even if the document Gn has the skew, consequently, the image is not read again. Thus, it is possible to read the image having no skew at a high time efficiency.

What is claimed is:

1. An image reading apparatus comprising:
    a document delivery path that couples, through a reading position, a document mounting portion for mounting a document from which an image is to be read and a document discharging portion for discharging the document from which the image has been read;
    a switchback delivery path coupled to a predetermined position of the document delivery path and inverting a leading and a trailing end in the document, thereby returning the document from a downstream side of the reading position to an upstream side of the reading position;
    an image reading unit that reads the image of the document delivered in the reading position of the document delivery path;
    a skew detecting unit that detects a skew of the document passing through the reading position; and
    a control unit that delivers the document to the switchback delivery path to read both sides of the document again when the skew detecting unit detects the skew of the document.

2. The image reading apparatus according to claim 1, wherein the control unit discharges the document to the document discharging portion and gives an error notice when the skew detecting unit detects the skew of the document a predetermined number of times or more.

3. The image reading apparatus according to claim 1, wherein the document delivery path is provided with a skew correcting unit that corrects the skew of a document.

4. The image reading apparatus according to claim 1, wherein the image reading unit comprises a line sensor for setting a transverse direction of the document delivery path to be a scanning line, and the skew detecting unit determines that the skew is present if the number of read lines of the document read by the image reading unit is equal to or greater than a predetermined number of lines.

5. The image reading apparatus according to claim 1, wherein the image reading unit comprises a line sensor for setting a transverse direction of the document delivery path to be a scanning line, and the skew detecting unit determines that the skew is present if a difference between the number of read lines of a first face and the number of read lines of a second face in the document read by the image reading unit is equal to or greater than a predetermined number of lines.

6. The image reading apparatus according to claim 1, wherein the skew detecting unit comprises a plurality of document sensors disposed at intervals in a transverse direction of the document delivery path for detecting a presence of the document and determines that the skew is present if a time difference between document detection timings of the document sensors is equal to or greater than a predetermined time difference.

7. The image reading apparatus according to claim 3, wherein the skew correcting unit comprises a register mechanism that causes a leading end of the document to hit against a delivery roller disposed in the document delivery path, thereby flexing the document.

8. The image reading apparatus according to claim 3, wherein the skew correcting unit comprises a register mechanism that flexes the document based on a difference in a circumferential speed between a pair of delivery rollers disposed apart from each other in a delivery direction in at least one of the document delivery path and the switchback delivery path.

* * * * *